US011338700B2

(12) United States Patent
Jain et al.

(10) Patent No.: US 11,338,700 B2
(45) Date of Patent: May 24, 2022

(54) BATTERY SWAPPING TO MANAGE IN-VEHICLE BATTERY COMMUNICATION

(71) Applicant: OLA ELECTRIC MOBILITY PRIVATE LIMITED, Bengaluru (IN)

(72) Inventors: Nishit Jain, Delhi (IN); Smit Gupta, Muradnagar (IN)

(73) Assignee: OLA ELECTRIC MOBILITY PRIVATE LIMITED, Bengaluru (IN)

(*) Notice: Subject to any disclaimer, the term of this patent is extended or adjusted under 35 U.S.C. 154(b) by 146 days.

(21) Appl. No.: 16/910,784

(22) Filed: Jun. 24, 2020

(65) Prior Publication Data

US 2021/0309121 A1 Oct. 7, 2021

(30) Foreign Application Priority Data

Apr. 3, 2020 (IN) .............................. 202041014855

(51) Int. Cl.
*B60L 58/12* (2019.01)
*B60L 58/18* (2019.01)
(Continued)

(52) U.S. Cl.
CPC ............. *B60L 58/12* (2019.02); *B60L 53/305* (2019.02); *B60L 58/18* (2019.02); *B60S 5/06* (2013.01);
(Continued)

(58) Field of Classification Search
CPC ........ B60L 58/12; B60L 53/305; B60L 58/18; B60S 5/06; H01M 10/46; H01M 2220/20;
(Continued)

(56) References Cited

U.S. PATENT DOCUMENTS 10,266,066 B2 4/2019 Tsuji et al.
11,084,365 B2 * 8/2021 Chen ..................... B60L 58/10
(Continued)

FOREIGN PATENT DOCUMENTS

JP 2012120347 A 6/2012
WO 2018104965 A1 6/2018
WO 2018154594 A1 8/2018

OTHER PUBLICATIONS

Mateo Beus et al., (Beus), Decentralized Master-Slave Communication and Control Architecture of a Battery Swapping Station, Jun. 2018, 2018 IEEE International Conference on Environment and Electrical Engineering and 2018 IEEE Industrial and Commercial Power Systems Europe, pp. 1-6 (Year: 2018).*

*Primary Examiner* — M Baye Diao
(74) *Attorney, Agent, or Firm* — Chip Law Group

(57) ABSTRACT

Battery swapping includes receiving a swap request for swapping a set of discharged batteries in a vehicle with a set of charged batteries at a charging station. Based on a battery swapping count provided by a user, the set of charged batteries including first and second subsets of charged batteries are selected from a plurality of charged batteries available at the charging station. At least one of a static ID or a dynamic ID is assigned to each charged battery. Each charged battery in the first and second subsets is configured as a master battery and a slave battery by integrating at least the respective static and dynamic ID in a corresponding battery management system of each charged battery, respectively, for facilitating in-vehicle battery communication. Further, the set of charged batteries is released from a charging and storing platform to a swapping platform for swapping.

20 Claims, 18 Drawing Sheets

(51) Int. Cl.
  *B60S 5/06* (2019.01)
  *H01M 10/46* (2006.01)
  *B60L 53/30* (2019.01)

(52) U.S. Cl.
  CPC ........ *H01M 10/46* (2013.01); *H01M 2220/20* (2013.01)

(58) Field of Classification Search
  CPC . H01M 2010/4271; H01M 2010/4278; H01M 10/425; H01M 10/441; Y02E 60/10; Y02T 10/70; Y02T 10/7072; Y02T 90/12; Y02T 90/16
  USPC ........................................................ 320/109
  See application file for complete search history.

(56) References Cited

U.S. PATENT DOCUMENTS

| | | | |
|---|---|---|---|
| 11,097,632 B2* | 8/2021 | Uyeki | B60L 53/65 |
| 2016/0359329 A1 | 12/2016 | Kim et al. | |
| 2019/0207267 A1* | 7/2019 | Vickery | H02J 7/0027 |
| 2019/0305263 A1 | 10/2019 | Kaneko | |
| 2020/0198494 A1* | 6/2020 | Chen | H02J 7/0048 |

* cited by examiner

BATTERY SWAPPING TO MANAGE IN-VEHICLE BATTERY COMMUNICATION

CROSS-RELATED APPLICATIONS

This application claims priority of Indian Application Serial No. 202041014855, filed Apr. 3, 2020, the contents of which are incorporated herein by reference.

FIELD

Various embodiments of the disclosure relate generally to battery swapping. More specifically, various embodiments of the disclosure relate to battery swapping to manage in-vehicle battery communication.

BACKGROUND

With the technological advancements and use of sustainable energy resources in vehicles, the popularity for electric vehicles is continuously increasing as an alternative to combustion engine vehicles. Each electric vehicle includes energy storage devices such as batteries. These batteries are utilized for providing necessary power (such as electrical and mechanical power) to the electric vehicle. However, the electric vehicles have certain drawbacks such as low mileage range due to power restrictions, size restrictions, and weight restrictions associated with these batteries. Further, after a regular interval of time, these batteries are required to be charged for continuously providing the necessary power to the electric vehicles. A standard battery may take several hours for recharging and travel may be interrupted during such recharging process.

Rapid charging techniques are currently being used to reduce an overall recharging time of each battery to 10 to 30 minutes. However, the rapid charging techniques decrease battery life and thus are not suitable for daily use. To overcome the aforementioned problems, battery swapping stations facilitate swapping of discharged batteries in an electric vehicle with charged batteries available at the battery swapping stations. Such battery swapping may take few minutes and eliminate the chances of battery degradation, and hence increase the overall battery life. After swapping, these charged batteries are utilized for powering the electric vehicle. Thus, unwanted and lengthy interruption may be reduced during a ride. Further, for managing the power within the electric vehicle, the charged batteries are communicatively coupled to a vehicle controller via an in-vehicle communication network. However, before installation of the charged batteries in the electric vehicle, a user needs to configure each charged battery by assigning a communication identifier (ID) associated with the in-vehicle communication network such that the communication ID facilitates communication of each charged battery with the vehicle controller via the in-vehicle communication network. Such manual configuration increases the overall time required for swapping the discharged batteries with the charged batteries.

In light of the foregoing, there exists a need for a technical and reliable solution that overcomes the above-mentioned problems, challenges, and short-comings, and continues to facilitate battery swapping services to individuals that manages the in-vehicle battery communication.

SUMMARY

Battery swapping to manage in-vehicle battery communication is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
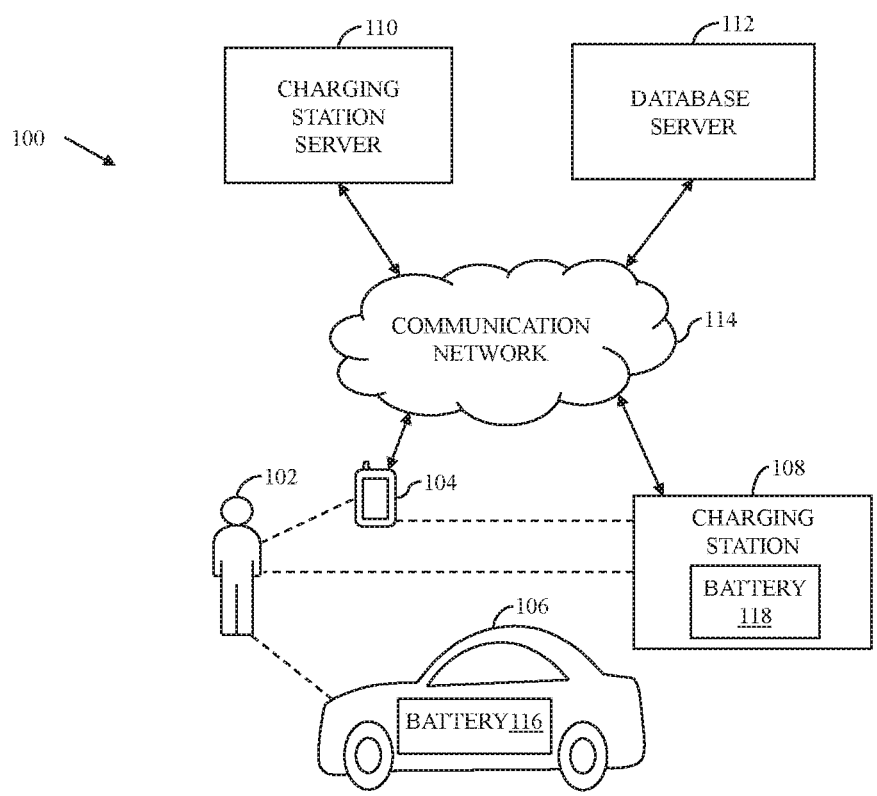
FIG. 1 is a block diagram that illustrates a system environment for battery swapping, in accordance with an exemplary embodiment of the disclosure.

Certain embodiments of the disclosure may be found in a disclosed apparatus for battery swapping. Exemplary aspects of the disclosure provide a battery swapping method and system for managing in-vehicle battery communication. The method includes one or more operations that are executed by circuitry of a charging station server of a charging station to facilitate swapping of one or more discharged batteries with one or more charged batteries available at the charging station. In an exemplary embodiment, the circuitry may be configured to receive a swap request from a computing device. The swap request may include a request for swapping a set of discharged batteries in a vehicle with a set of charged batteries available at the charging station. The circuitry may be further configured to authenticate a user associated with the vehicle upon reception of the swap request. Upon successful authentication of the user, the circuitry may be further configured to retrieve a set of parameters associated with the user from a database server. The set of parameters may include at least one of user profile information, vehicle information, or battery count information. The battery count information indicates the maximum number of batteries in the vehicle. The circuitry may be further configured to receive a battery swapping count from the computing device upon successful authentication of the user. The battery swapping count may indicate a number of batteries that needs to be swapped. Based on at least one of the battery swapping count and the set of parameters, the circuitry may be further configured to select the set of charged batteries from a plurality of charged batteries available at the charging station for swapping. The set of charged batteries may be selected such that a number of charged batteries is equal to the battery swapping count provided by the user.

In an embodiment, the circuitry may be further configured to detect an indication that indicates reception of the set of discharged batteries at a swapping platform of the charging station from the user for swapping with the set of charged batteries selected from the plurality of charged batteries. Based on the detected indication, the circuitry may be further configured to retrieve battery identifier (ID) information from a battery management system (BMS) of each of the set of discharged batteries received at the swapping platform. The battery ID information of each discharged battery may include at least one of a previously assigned static ID or a previously assigned dynamic ID. After retrieving the battery ID information of each of the set of discharged batteries, the circuitry may be further configured to reset the set of discharged batteries.

In an embodiment, the circuitry may be further configured to assign at least one of a static ID or a dynamic ID to each of the set of charged batteries. The set of charged batteries may include a first subset of charged batteries and a second subset of charged batteries. The first subset of charged batteries may be selected from the set of charged batteries when there is a request for swapping a discharged master battery with a charged master battery. Such request may be identified based on the battery ID information of each discharged battery. The first subset of charged batteries may include at least a first charged battery to be configured as a master battery. The second subset of charged batteries may be selected from the set of charged batteries when there is a request for swapping a discharged slave battery with a charged slave battery. Such request may be identified based on the battery ID information of each discharged battery. The second subset of charged batteries may include at least a second charged battery to be configured as a slave battery.

In an embodiment, each charged battery may be assigned at least one of the static ID or the dynamic ID based on the battery ID information of each discharged battery for which swapping is currently being performed. For example, each of the first subset of charged batteries may be configured as the master battery by integrating at least the respective static ID in a BMS of each of the first subset of charged batteries and each of the second subset of charged batteries may be configured as the slave battery by integrating at least the respective dynamic ID in a BMS of each of the second subset of charged batteries. The dynamic ID of each slave battery may be further integrated in the BMS of the master battery. In some embodiments, the BMS of each slave battery and the BMS of each master battery may also include the information associated with the static and dynamic IDs of other batteries.

In an embodiment, the static and dynamic IDs may be assigned and integrated for facilitating the in-vehicle battery communication in the vehicle. The static ID is assigned to the first charged battery for facilitating communication between the master battery and each of a set of nodes in an in-vehicle communication network. The in-vehicle communication network is a controller area network (CAN). The dynamic ID is assigned to each slave battery for facilitating communication between the master battery and each slave battery in the vehicle.

In an embodiment, the circuitry may be further configured to release the set of charged batteries from a charging and storing platform of the charging station to the swapping platform for facilitating the swapping of the set of discharged batteries with the set of charged batteries. An order of releasing each of the set of charged batteries is based on an order of receiving each of the set of discharged batteries for swapping with the set of charged batteries. Prior to swapping, the set of discharged batteries may be communicatively coupled to the in-vehicle communication network of the vehicle. After swapping the set of discharged batteries with the set of charged batteries, the set of charged batteries may be communicatively coupled to the in-vehicle communication network including the set of nodes. The set of charged batteries and the set of nodes communicate with each other by way of a CAN bus. The master battery broadcasts the static ID to the set of nodes for managing the in-vehicle battery communication, when the master battery is communicatively coupled to the in-vehicle communication network.

Thus, various methods and systems of the disclosure provide the battery swapping for managing the in-vehicle battery communication. The disclosed battery swapping methods and systems may facilitate an alternative method for assigning at least one of the static ID or the dynamic ID to each charged battery being swapped with a discharged battery. Further, automatic assigning of at least one of the static ID or the dynamic ID to each charged battery helps to eliminate manual assignment of the static ID or the dynamic ID by the user. Thus, an overall time required for swapping the set of discharged batteries with the set of charged batteries is reduced as compared to the conventional swapping techniques. Also, each charged battery is configured as a master battery or a slave battery by integrating the respective static ID or dynamic ID in the BMS of each charged battery to facilitate communication via the in-vehicle communication network. Further, the static and dynamic IDs are assigned based on the battery ID information retrieved from the BMS of each discharged battery. Thus, a need for the user to configure each charged battery as a master battery or a slave battery based on the battery ID information is eliminated, thereby reducing a time required and complexity of assigning the static and dynamic IDs compared to conventional techniques. Also, as the set of discharged batteries is swapped with the configured set of charged batteries and installed in the vehicle, the configured set of charged batteries may be capable of communicating via the in-vehicle communication network without any requirement of manual configuration by the user. Thus, the disclosed battery swapping methods and systems eliminate manual configuration of the charged batteries, reduce an overall time of swapping the set of discharged batteries, and manage the in-vehicle battery communication.

FIG. 1 is a block diagram that illustrates a system environment 100 for battery swapping, in accordance with an exemplary embodiment of the disclosure. The system environment 100 includes a user 102, a computing device 104, a vehicle 106, a charging station 108, a charging station server 110, and a database server 112. The vehicle 106 may include one or more batteries such as a discharged battery 116. The charging station 108 may include one or more batteries such as a charged battery 118. The computing device 104, the charging station 108, the charging station server 110, and the database server 112 may be coupled to each other via a communication network 114.

The user 102 is an individual who may want to swap a set of discharged batteries (such as the discharged battery 116) in the vehicle 106 with a set of charged batteries (such as the charged battery 118) at the charging station 108 by availing battery swapping services offered by a battery swapping service provider. The battery swapping services may be availed, by the user 102, by initiating one or more swap requests. The one or more swap requests may be initiated, by the user 102, by utilizing a service application running on the computing device 104. In an exemplary embodiment, the user 102 is an assistant associated with the charging station 108 who performs one or more operations related to the battery swapping for the vehicle 106. In another exemplary embodiment, the user 102 is a driver of the vehicle 106 who performs one or more operations related to the battery swapping for the vehicle 106.

The computing device 104 may include suitable logic, circuitry, interfaces, and/or code, executable by the circuitry, that may be configured to perform one or more operations. The one or more operations may be performed by utilizing the service application running on the computing device 104. The service application may be associated with the battery swapping service provider and hosted by the charging station server 110. The computing device 104 may correspond to a driver device of the driver of the vehicle 106 or a charging station console device of the charging station 108. Thus, in some embodiments, the computing device 104 may be utilized, by the driver of the vehicle 106, to perform the one or more operations, and, in some embodiments, the computing device 104 may be utilized, by the assistant of the charging station 108, to perform the one or more operations. Examples of the computing device 104 may include, but are not limited to, a personal computer, a laptop, a smartphone, and a tablet computer.

In an embodiment, the computing device 104 may be utilized, by the user 102, to perform the one or more operations related to the battery swapping. For example, the computing device 104 may be utilized, by the user 102, for locating one or more charging stations (such as the charging station 108) near the vehicle 106 for the battery swapping. The computing device 104 may be further utilized, by the user 102, for checking availability of charged batteries at the one or more charging stations (such as the charging station 108). The computing device 104 may be further utilized, by the user 102, for obtaining swapping cost associated with the battery swapping at the one or more charging stations (such as the charging station 108). The computing device 104 may be further utilized, by the user 102, for navigating from a current location of the user 102 to a preferred charging station (such as the charging station 108). The preferred charging station (such as the charging station 108) may be selected from the one or more charging stations, by the user 102, based on at least one of locations of the one or more charging stations from the current location of the user 102, the availability of the charged batteries at the one or more charging stations, or the swapping cost associated with the battery swapping at the one or more charging stations.

After reaching the preferred charging station (such as the charging station 108) for the battery swapping, the computing device 104 may be further utilized, by the user 102, for initiating a swap request for swapping one or more discharged batteries. The swap request may include a request for swapping the set of discharged batteries (such as the discharged battery 116) in the vehicle 106 of the user 102 with the set of charged batteries (such as the charged battery 118) available at the charging station 108. The swap request may further include a user identifier (ID) of the user 102. Various modes of input that may be utilized, by the user 102, to initiate the swap request include, but are not limited to, a touch-based input, a text-based input, a voice-based input, a gesture-based input, or a combination thereof. Further, upon confirmation of the swap request by the user 102, the computing device 104 may be configured to transmit the swap request to the charging station server 110 via the communication network 114. In another embodiment, the service application (running on the computing device 104) may be configured to generate the swap request based on input(s) provided by the user 102 and transmit the swap request to the charging station server 110 via the communication network 114. The swap request may be communicated to the charging station server 110 in an encrypted format so as to ensure data security.

In an embodiment, the computing device 104 may be configured to receive, from the charging station server 110 via the communication network 114, one or more user interfaces that enable the user 102 to interact with one or more computing devices, servers, or applications for performing the one or more operations. The one or more user interfaces may be received in response to the swap request initiated by the user 102. Further, the computing device 104 may be utilized, by the user 102, to view the one or more user interfaces (one at a time) rendered by the charging station server 110. Further, the computing device 104 may be utilized, by the user 102, for interacting with the one or more user interfaces so as to provide one or more inputs for initiating the one or more operations associated with the swap request. For example, the computing device 104 may be utilized, by the user 102, to provide an input to select an authentication method from one or more authentication methods presented on one of the one or more user interfaces such as an authentication user interface. The one or more authentication methods may include, but are not limited to, a one-time-password-based (OTP-based) authentication, a biometric-based authentication, a username-and-password-based authentication, a radio-frequency-identification-tag-based (RFID-tag-based) authentication, or a combination thereof. In another example, the computing device 104 may be utilized, by the user 102, to provide an input for a battery swapping count presented on one of the one or more user interfaces such as a battery count user interface. The battery swapping count may indicate a number of batteries (as preferred by the user 102) that needs to be swapped based on the current swap request.

In an embodiment, the computing device 104 may be configured to receive a set of parameters associated with the user 102 from the charging station server 110. The set of parameters may be received based on successful authentication of the user 102. The computing device 104 may be further utilized, by the user 102, to view the set of parameters including at least one of user profile information, vehicle information, or battery count information. The user profile information of each user (such as the user 102) may include at least one of a username, a unique user ID, a user contact number, or a user account registered with the battery swapping service provider. Similarly, the vehicle information of each vehicle (such as the vehicle 106) may include at least a vehicle ID, a registered vehicle make, or a vehicle type. The battery count information may indicate the maximum number of batteries in the vehicle 106. The set of parameters may also include other battery-related information such as a battery type, a battery capacity, a battery health, or the like.

The vehicle 106 is a mode of transportation that is utilized, by the user 102 (such as the driver), to commute from one location to another location. The vehicle 106 may include suitable logic, circuitry, interfaces and/or code, executable by the circuitry, that may be configured to control and perform one or more operations with or without any driving assistance from the driver such as the user 102. In an embodiment, the vehicle 106 may be deployed by a transport service provider (e.g., a cab service provider) to cater to travelling requirements of various passengers. In another embodiment, the vehicle 106 may be privately owned by an individual such as the user 102 and used for fulfilling self-travelling requirements. The vehicle 106 may be an electric vehicle (also called an EV) that uses one or more electric motors or traction motors for propulsion. The electric vehicle may be powered through a collector system by electricity from off-vehicle sources, or may be self-contained with one or more energy storage devices such as batteries that are swappable with other similar batteries as and when required. These batteries are utilized for providing necessary power (such as electrical and mechanical power) to the electric vehicle. Examples of the vehicle 106 may include, but are not limited to, an automobile, a bus, a car, an auto rickshaw, and a bike. In an exemplary embodiment, the vehicle 106 may be associated with one of a battery electric vehicle (BEV) or a hybrid electric vehicle (HEV).

The charging station 108 is a battery swapping station that facilitates the battery swapping services. The charging station 108 may include suitable logic, circuitry, interfaces and/or code, executable by the circuitry, that may be configured to control and perform one or more operations for the battery swapping. In an embodiment, the charging station 108 may include a charging and storing platform (shown in FIGS. 6, 7A-7E, and 8A-8C) for charging one or more discharged batteries (such as the set of discharged batteries, for example, the discharged battery 116 in the vehicle 106) and storing one or more charged batteries (such as the set of charged batteries, for example, the charged battery 118). The charging platform may include one or more charging slots that are utilized to charge the one or more discharged batteries. The storing platform may include one or more storing slots that are utilized to store the one or more charged batteries. The charging station 108 may further include a swapping platform (shown in FIGS. 6, 7A-7E, and 8A-8C) for receiving the set of discharged batteries (such as the discharged battery 116) to be swapped from the user 102 and releasing the set of charged batteries (such as the charged battery 118) from the charging and storing platform. Each discharged battery (such as the discharged battery 116) received at the swapping platform is assigned a corresponding charging slot in the charging platform for charging each discharged battery. After each discharged battery is charged to a charging level, a corresponding storing slot in the storing platform is assigned for storing each charged battery.

The charging station server 110 may include suitable logic, circuitry, interfaces, and/or code, executable by the circuitry, that may be configured to perform one or more operations for the battery swapping to manage in-vehicle battery communication. The charging station server 110 may be a computing device, which may include a software framework, that may be configured to create the charging station server implementation and perform the various operations associated with the battery swapping for managing the in-vehicle battery communication. The charging station server 110 may be realized through various web-based technologies, such as, but are not limited to, a Java web-framework, a .NET framework, a PHP framework, a python framework, or any other web-application framework. The charging station server 110 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the charging station server 110 may include, but are not limited to, a personal computer, a laptop, or a network of computer systems.

In an embodiment, the charging station server 110 may be configured to process, control, and manage various functionalities and operations such as swap request reception, user authentication, battery reception, battery selection, ID assignment, battery configuration, battery release, and the like. For example, the charging station server 110 may be further configured to receive the one or more swap requests (such as the swap request initiated by the user 102) from one or more computing devices (such as the computing device 104) via the communication network 114. Based on the received swap request, the charging station server 110 may be further configured to authenticate the user 102. Upon successful authentication of the user 102, the charging station server 110 may be further configured to receive the battery swapping count from the computing device 104. Further, based on at least the battery swapping count, the charging station server 110 may be further configured to select the set of charged batteries (such as the charged battery 118) from a plurality of charged batteries available at the charging station 108. The charging station server 110 may be further configured to assign at least one of a static ID or a dynamic ID to each of the set of charged batteries including at least one of first and second subsets of charged batteries. The set of charged batteries may be distributed into the first and second subsets of charged batteries based on the swapping requirements. For example, the first subset of charged batteries may be selected from the set of charged batteries when there is a request for swapping a discharged master battery with a charged master battery. Such request may be identified based on the battery ID information of each discharged battery. The first subset of charged batteries may include at least a first charged battery to be configured as a master battery. Similarly, the second subset of charged batteries may be selected from the set of charged batteries when there is a request for swapping a discharged slave battery with a charged slave battery. Such request may be identified based on the battery ID information of each discharged battery. The second subset of charged batteries may include at least a second charged battery to be configured as a slave battery. Each of the first subset of charged batteries may be configured as the master battery by integrating at least the respective static ID in a battery management system (BMS) of each of the first subset of charged batteries. Similarly, each of the second subset of charged batteries may be configured as a slave battery by integrating at least the respective dynamic ID in a BMS of each of the second subset of charged batteries. The static and dynamic IDs may be assigned and integrated for facilitating the in-vehicle battery communication. The charging station server 110 may further release the set of charged batteries from the charging and storing platform of the charging station 108 to the swapping platform of the charging station 108 for swapping the set of discharged batteries with the set of charged batteries. The charging station server 110 may be further configured to process other services and requests associated with swapping of the set of discharged batteries with the set of charged batteries, and accordingly, may control, modify, and execute the other services and requests prior to the battery swapping or during the battery swapping. Various operations and functionalities of the charging station server 110 have been described in detail in conjunction with FIGS. 2-6, 7A-7E, 8A-8C, and 9A-9C.

The database server 112 may include suitable logic, circuitry, interfaces, and/or code, executable by the circuitry, that may be configured to perform one or more database operations, such as receiving, storing, processing, and transmitting queries, data, or content. The database server 112 may be a data management and storage computing device that is communicatively coupled to the computing device 104, the charging station 108, and the charging station server 110 via the communication network 114 to perform the one or more database operations. Examples of the database server 112 may include, but are not limited to, a personal computer, a laptop, or a network of computer systems.

In an embodiment, the database server 112 may be configured to manage and store historical swap data of various users such as the user 102. The historical swap data of each user (such as the user 102) may include data of previous swap requests initiated by each user in the past for various vehicles (such as the vehicle 106). In an exemplary embodiment, the historical swap data of each user may include at least historical swap locations, a frequency of swap requests, a time of each swap request initiated by the user 102, a payment history for the previous swap requests, and a rating for each swap request. The historical swap data may further include historical preferences of each user. For example, the historical preferences may be indicative of various authentication methods and payment methods preferred by each user. The database server 112 may be configured to obtain the historical swap data of each user (such as the user 102) from at least one of the computing devices (such as the computing device 104), the charging station 108, or the charging station server 110.

In an embodiment, the database server 112 may be further configured to manage and store the set of parameters associated with each user (such as the user 102). The set of parameters may include at least one of the user profile information, the vehicle information, or the battery count information. The database server 112 may be further configured to generate a data structure including one or more rows and columns for storing the set of parameters associated with each user in a structured manner. For example, each row may be associated with the user ID of each user, and one or more columns corresponding to each row may indicate the username, the user ID, the historical swap locations, the frequency of swap requests, the time of each swap request, and/or the user preferences. In an embodiment, the database server 112 may be configured to store availability information, location information, charging level information, and battery type information of each battery at the charging station 108. The availability information may indicate a current availability status of each battery at the charging station 108. The current availability status of each battery may indicate whether the corresponding battery is available for swapping or not. The location information may indicate a location (such as a storing slot) at which each battery is stored at the charging station 108.

The charging level information may indicate a current charge level of each battery. The charging level information may further indicate a charging status, such as "charging", "discharging", "fully charged", or the like, of each battery. The battery type information may indicate a type (such as a master battery or a slave battery) of each battery at the charging station 108. The availability information, the location information, the charging level information, and the battery type information of each battery may be dynamically updated in real-time by the charging station server 110.

In an embodiment, the database server 112 may be further configured to receive a query from the charging station server 110 via the communication network 114. The query may be an encrypted message that is decoded by the database server 112 to determine one or more requests for retrieving requisite information (such as the user profile information, the vehicle information, the battery count information, the availability information, the location information, the charging level information, the battery type information, or any combination thereof). In response to the determined one or more requests, the database server 112 may be configured to retrieve and communicate the requested information to the charging station server 110 via the communication network 114. Various operations of the database server 112 have been described in detail in conjunction with FIGS. 2-6, 7A-7E, 8A-8C, and 9A-9C.

The communication network 114 may include suitable logic, circuitry, interfaces, and/or code, executable by the circuitry, that may be configured to transmit queries, messages, and requests between various entities, such as the computing device 104, the charging station 108, the charging station server 110, and/or the database server 112. Examples of the communication network 114 include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the system environment 100 may be coupled to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the charging station server 110 may be configured to receive the swap request from the computing device 104. The swap request may be initiated by the user 102 for swapping the set of discharged batteries (such as the discharged battery 116) in the vehicle 106 with the set of charged batteries (such as the charged battery 118) available at the charging station 108. In an example, the swap request may include the user ID of the user 102. In an embodiment, the charging station server 110 may be further configured to generate and render a first user interface (shown in FIG. 3) on the computing device 104. The first user interface may present an indication associated with the reception of the swap request from the computing device 104. The first user interface may further present the user ID of the user 102 and an interactive interface element. The first user interface may be utilized, by the user 102, to interact with the interactive interface element so as to proceed with authentication. When the user 102 selects the interactive interface element, the charging station server 110 may be further configured to initiate an authentication process to authenticate the user 102. To perform authentication of the user 102, the charging station server 110 may be further configured to generate and render a second user interface (shown in FIG. 4) on the computing device 104. The second user interface may present the one or more authentication methods as one or more selectable options to the user 102. The one or more authentication methods may include, but are not limited to, the OTP-based authentication, the biometric-based authentication, the username-and-password-based authentication, the RFID-tag-based authentication, or a combination thereof. The second user interface may be utilized, by the user 102, to select an authentication method from the one or more authentication methods. After receiving the authentication method selected by the user 102, the charging station server 110 may be configured to initiate the authentication process to authenticate the user 102 based on the selected authentication method. In an example, when the RFID-tag-based authentication method is selected by the user 102, the charging station server 110 may authenticate the user 102 by performing a successful verification of an RFID tag (not shown) associated with the user 102. The verification of the RFID tag associated with the user 102 may be performed by utilizing an RFID reader module (not shown) associated with the charging station 108. The RFID reader module may be operated (either automatically or by the assistant associated with the charging station 108) to read user information (for example, the user ID) from the RFID tag. The read user information may be compared with the stored user information in the database server 112. When the read user information does not match with the stored user information, the user 102 may not be authenticated. When the read user information matches with the stored user information, the user 102 may be successfully authenticated. Upon successful authentication of the user 102, the charging station server 110 may be configured to retrieve the set of parameters associated with the user 102 from the database server 112. The set of parameters may include at least one of the user profile information, the vehicle information, or the battery count information. The set of parameters may also include other battery-related information such as the battery configuration including at least the battery type, the battery capacity, the battery health, or the like of each battery.

In an embodiment, after successful authentication of the user 102, the charging station server 110 may be configured to generate and render a third user interface (shown in FIG. 5) on the computing device 104. The third user interface may present an input box to the user 102 for providing the battery swapping count. The battery swapping count may indicate a number of discharged batteries that the user 102 wants to swap with charged batteries at the charging station 108. The third user interface may be utilized, by the user 102, to provide the battery swapping count in the input box. The charging station server 110 may be configured to receive the battery swapping count from the computing device 104. In an example, the battery swapping count received is '2'. Thus, the set of discharged batteries includes '2' discharged batteries that need to be swapped with '2' charged batteries at the charging station 108. Based on at least one of the battery swapping count provided by the user 102 and the set of parameters, the charging station server 110 may be configured to select the set of charged batteries from the plurality of charged batteries available at the charging station 108. The set of charged batteries may be selected such that a number of charged batteries in the set of charged batteries is equal to the battery swapping count. In the example, the number of charged batteries in the set of charged batteries is '2'. Further, in an example, the set of charged batteries may be selected such that each selected charged battery matches battery configuration of each discharged battery in the set of discharged batteries. In an embodiment, the charging station server 110 may generate and render a user interface on the computing device 104 that may present a battery count error to the user 102 when the user 102 inputs an invalid value for the battery swapping count. In an example, the battery count error is presented to the user 102 when a value of the battery swapping count provided by the user 102 is greater than the maximum number of batteries in the vehicle 106.

In an embodiment, the charging station server 110 may be configured to detect an indication indicating reception of the set of discharged batteries at the swapping platform from the user 102 for swapping with the set of charged batteries. In an example, the swapping platform may include a set of sensors (not shown) that detects a placement of the set of discharged batteries on the swapping platform by the user 102 and generates the indication indicating that the set of discharged batteries has been received at the swapping platform from the user 102. In one example, at any given time instance for performing the battery swapping, only one discharged battery from the set of discharged batteries may be placed on the swapping platform. In another example, at any given time instance for performing the battery swapping, a plurality of discharged batteries from the set of discharged batteries may be placed on the swapping platform. Based on the detected indication, the charging station server 110 may be configured to retrieve battery ID information from a BMS of each of the set of discharged batteries. The battery ID information of each discharged battery may include at least one of a previously assigned static ID or a previously assigned dynamic ID of each discharged battery. The previously assigned static ID or the previously assigned dynamic ID is utilized for facilitating in-vehicle communication of each discharged battery in the vehicle 106 with a vehicle controller (not shown) in the vehicle 106 via an in-vehicle communication network. The BMS of each battery may include suitable logic, circuitry, interfaces, and/or code, executable by the circuitry, that may be configured to perform the one or more operations for managing the in-vehicle communication of each battery with the vehicle controller via the in-vehicle communication network based on the previously assigned static or the previously assigned dynamic ID. After retrieving the battery ID information from the BMS of each discharged battery, the charging station server 110 may be configured to reset the battery ID information in the BMS of each discharged battery received on the swapping platform.

In an embodiment, the charging station server 110 identifies that the set of discharged batteries includes a first discharged battery that is configured as a master battery based on the previously assigned static ID. Based on the identification of the first discharged battery, the charging station server 110 may be configured to select, from the set of charged batteries, the first subset of charged batteries including at least the first charged battery to be configured as the master battery. Further, the charging station server 110 may be configured to select, from the set of charged batteries, the second subset of charged batteries including at least the second charged battery to be configured as the slave battery.

In an embodiment, the charging station server 110 may be further configured to assign at least one of the static ID or the dynamic ID to each of the set of charged batteries including the first subset of charged batteries and the second subset of charged batteries. Each charged battery may be assigned at least one of the static ID or the dynamic ID based on the battery ID information of each discharged battery for which swapping is currently being performed. In an example, if a discharged battery, for which swapping is currently being performed at the charging station 108, is configured as a master battery and the BMS of the discharged battery includes a previously assigned static ID in the battery ID information, then the corresponding charged battery is also configured as a master battery and is assigned a static ID that is the same as the previously assigned static ID. In another example, if a discharged battery, for which swapping is currently being performed at the charging station 108, is configured as a slave battery and the BMS of the discharged battery includes a previously assigned dynamic ID in the battery ID information, then the corresponding charged battery is also configured as a slave battery and is assigned a dynamic ID that is the same as the previously assigned dynamic ID.

In an embodiment, each of the first subset of charged batteries may be configured as a master battery by integrating at least the respective static ID in the BMS of each of the first subset of charged batteries and each of the second subset of charged batteries may be configured as a slave battery by integrating at least the respective dynamic ID in the BMS of each of the second subset of charged batteries. The dynamic ID of each slave battery is further integrated in the BMS of the master battery.

In an embodiment, the static and dynamic IDs are assigned and integrated for facilitating the in-vehicle battery communication with the vehicle controller in the vehicle 106. For example, the static ID is assigned to each of the first subset of charged batteries (such as the first charged battery that operates as the master battery in the vehicle 106) for facilitating communication between the master battery and each of a set of nodes in the in-vehicle communication network. The set of nodes enable communication between various devices, such as the vehicle controller and batteries, associated with the vehicle 106. Each node of the set of nodes is able to transmit and receive messages. The in-vehicle communication network may be a controller area network (CAN). The dynamic ID is assigned to each of the second subset of charged batteries (such as the second charged battery that operates as the slave battery in the vehicle 106) for facilitating communication between the master battery and the slave battery in the vehicle 106.

In an embodiment, the charging station server 110 may be further configured to release the set of charged batteries from the charging and storing platform of the charging station 108 to the swapping platform of the charging station 108 for facilitating the swapping of the set of discharged batteries with the set of charged batteries. An order of releasing each of the set of charged batteries is based on an order of receiving each of the set of discharged batteries on the swapping platform. Prior to the swapping, the set of discharged batteries is communicatively coupled to the in-vehicle communication network deployed in the vehicle 106. After the swapping, the set of charged batteries is communicatively coupled to the in-vehicle communication network including the set of nodes. The set of charged batteries and the set of nodes communicate with each other by way of a CAN bus. The master battery, such as the first charged battery, broadcasts the static ID to the set of nodes for managing the in-vehicle battery communication, when the master battery is communicatively coupled to the in-vehicle communication network. Various other functionalities and operations of the charging station server 110 have been described in detail in conjunction with FIGS. 2-6, 7A-7E, 8A-8C, and 9A-9C.

Figure 2:
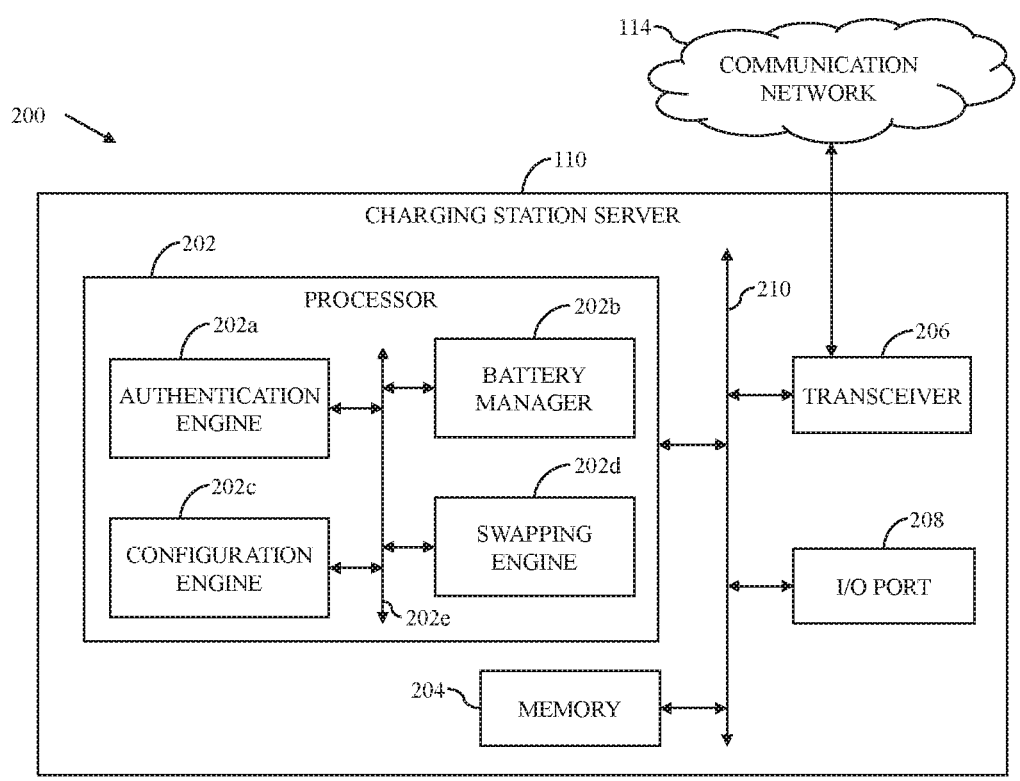
FIG. 2 is a block diagram that illustrates a charging station server of the system environment of FIG. 1, in accordance with an exemplary embodiment of the disclosure.

FIG. 2 is a block diagram 200 that illustrates the charging station server 110, in accordance with an exemplary embodiment of the disclosure. The charging station server 110 includes circuitry such as a processor 202, a memory 204, a transceiver 206, and an input/output (I/O) port 208 that communicate with each other by way of a first communication bus 210.

The processor 202 may include suitable logic, circuitry, interfaces, and/or code, executable by the circuitry, that may be configured to perform one or more operations associated with the battery swapping for managing the in-vehicle battery communication. Examples of the processor 202 may include, but are not limited to, an application-specific integrated circuit (ASIC) processor, a reduced instruction set computing (RISC) processor, a complex instruction set computing (CISC) processor, and a field-programmable gate array (FPGA). It will be apparent to a person of ordinary skill in the art that the processor 202 may be compatible with multiple operating systems.

In an embodiment, the processor 202 may be configured to control and manage various functionalities and operations such as swap request reception, user authentication, battery reception, battery selection, ID assignment, battery configuration, and battery release associated with the battery swapping. The various functionalities and operations may be controlled and managed by one or more internal components of the processor 202, such as an authentication engine 202a, a battery manager 202b, a configuration engine 202c, and a swapping engine 202d, that communicate with each other by way of a second communication bus 202e. In some embodiments, the processor 202 may operate as a master processing unit, and the authentication engine 202a, the battery manager 202b, the configuration engine 202c, and the swapping engine 202d may operate as slave processing units. In such a scenario, the processor 202 may be configured to instruct the authentication engine 202a, the battery manager 202b, the configuration engine 202c, and the swapping engine 202d to perform their corresponding operations either independently or in conjunction with each other.

The authentication engine 202a may include suitable logic, circuitry, interfaces, and/or code, executable by the circuitry, that may be configured to perform the one or more operations for authenticating users such as the user 102. The authentication engine 202a may be implemented by one or more processors, such as, but are not limited to, an ASIC processor, a RISC processor, a CISC processor, and an FPGA processor. Further, the authentication engine 202a may include a machine-learning model that implements any suitable machine-learning techniques, statistical techniques, or probabilistic techniques for performing the one or more operations for authenticating the users.

In an exemplary embodiment, the authentication engine 202a may be configured to extract the historical swap data of the user 102 from the database server 112 and store the extracted historical swap data in the memory 204. The authentication engine 202a may be further configured to extract the user profile information of the user 102 from the database server 112 and store the extracted user profile information in the memory 204. The authentication engine 202a may be further configured to process the historical swap data (such as preferred authentication methods, or the like) to select one or more authentication methods for the user 102. In an embodiment, the one or more authentication methods for the user 102 may be selected in real-time when the swap request is initiated by the user 102. In another embodiment, the one or more authentication methods for the user 102 may be selected well in advance (for example, at the time of registration of the user 102 with the battery swapping service provider) and may be stored in the database server 112. Further, the authentication engine 202a may be configured to receive a selection of an authentication method from the one or more authentication methods from the computing device 104. Based on the selected authentication method, the authentication engine 202a may be further configured to initiate the authentication process to authenticate the user 102 upon reception of the swap request.

The battery manager 202b may include suitable logic, circuitry, interfaces, and/or code, executable by the circuitry, that may be configured to perform the one or more operations associated with battery selection and battery charging. The battery manager 202b may be implemented by one or more processors, such as, but are not limited to, an ASIC processor, a RISC processor, a CISC processor, and an FPGA processor. Further, the battery manager 202b may include a machine-learning model that implements any suitable machine-learning techniques, statistical techniques, or probabilistic techniques for performing the one or more operations associated with battery selection and battery charging.

In an exemplary embodiment, upon successful authentication of the user 102, the battery manager 202b may be configured to receive the battery swapping count from the computing device 104. Further, based on at least one of the battery swapping count and the set of parameters, the battery manager 202b may be configured to select the set of charged batteries from the plurality of charged batteries available at the charging station 108. In one example, the set of charged batteries may be selected such that a count of selected charged batteries is equal to the battery swapping count provided by the user 102. In another example, the set of charged batteries may be selected such that each selected charged battery is in accordance with the set of parameters and thus each selected charged battery meets one or more parameters, such as a battery type, a battery capacity, a battery health, or the like, of each discharged battery. In another example, the set of charged batteries may be selected such that the count of selected charged batteries is equal to the battery swapping count and each selected charged battery is in accordance with the set of parameters.

Further, upon reception of each discharged battery at the swapping platform, the battery manager 202b may be configured to retrieve the battery ID information that includes at least one of the previously assigned static or the previously assigned dynamic ID from the BMS of each discharged battery. Further, when the battery manager 202b identifies the first discharged battery that is configured as the master battery based on the previously assigned dynamic ID, the battery manager 202b may be configured to select, from the set of charged batteries, the first subset of charged batteries including at least the first charged battery to be configured as the master battery. The battery manager 202b may be further configured to select, from the set of charged batteries, the second subset of charged batteries including at least the second charged battery to be configured as the slave battery. In an exemplary scenario in which the set of discharged batteries includes only one master battery and others as slave batteries, the battery manager 202b may be configured to select, from the set of charged batteries, the first charged battery to be configured as the master battery and the remaining charged batteries to be configured as the slave batteries. In another exemplary scenario in which the set of discharged batteries includes only one master battery, the battery manager 202b may configure the set of charged batteries including the first charged battery as the master battery. In another exemplary scenario in which the set of discharged batteries only includes one or more slave batteries, the battery manager 202b may configure the set of charged batteries including one or more charged batteries as the slave batteries. Further, after retrieving the battery ID information from the BMS of each discharged battery, the battery manager 202b may be configured to reset the battery ID information of each discharged battery. Further, the battery manager 202b may be configured to manage charging of each discharged battery received from the user 102 at the swapping platform of the charging station 108. For facilitating the charging of each discharged battery, the battery manager 202b may detect an available charging slot in the charging platform of the charging station 108 and facilitate transportation of each discharged battery from the swapping platform to the available charging slot in the charging platform for initiating the charging process. Upon completion of the charging, the battery manager 202b may detect an available storing slot in the storing platform of the charging station 108 and facilitate transportation of each charged battery from the charging platform to the available storing slot in the storing platform for initiating the storing process.

The configuration engine 202c may include suitable logic, circuitry, interfaces, and/or code, executable by the circuitry, that may be configured to perform the one or more operations associated with configuration of the set of charged batteries. The configuration engine 202c may be implemented by one or more processors, such as, but are not limited to, an ASIC processor, a RISC processor, a CISC processor, and an FPGA processor. Further, the configuration engine 202c may include a machine-learning model that implements any suitable machine-learning techniques, statistical techniques, or probabilistic techniques for performing the one or more operations associated with configuration of the set of charged batteries.

In an exemplary embodiment, the configuration engine 202c may be configured to assign at least one of the static ID or the dynamic ID to each of the set of charged batteries including at least one of the first subset of charged batteries (for configuring as the master battery) and the second subset of charged batteries (for configuring as the slave battery). Each charged battery may be assigned at least one of the static ID or the dynamic ID based on the battery ID information of each discharged battery for which swapping is currently being performed. The configuration engine 202c may be configured to configure each of the first subset of charged batteries (such as the first charged battery) as the master battery by integrating at least the respective static ID in the BMS of each of the first subset of charged batteries. Further, the configuration engine 202c may be configured to configure each of the second subset of charged batteries (such as the second charged battery) as the slave battery by integrating at least the respective dynamic ID in the BMS of each of the second subset of charged batteries. The dynamic ID of each slave battery may be further integrated in the BMS of the master battery such as the first charged battery.

The swapping engine 202d may include suitable logic, circuitry, interfaces, and/or code, executable by the circuitry, that may be configured to perform the one or more operations associated with the battery swapping. The swapping engine 202d may be implemented by one or more processors, such as, but are not limited to, an ASIC processor, a RISC processor, a CISC processor, and an FPGA processor. Further, the swapping engine 202d may include a machine-learning model that implements any suitable machine-learning techniques, statistical techniques, or probabilistic techniques for performing the one or more operations associated with the battery swapping.

In an exemplary embodiment, based on the swap request initiated by the user 102, the swapping engine 202d may be configured to release the set of charged batteries from the charging and storing platform of the charging station 108 to the swapping platform of the charging station 108 for swapping the set of discharged batteries with the set of charged batteries. The order of releasing each of the set of charged batteries may be based on the order of receiving each of the set of discharged batteries from the user 102. For example, the swapping engine 202d may release the first charged battery followed by the second charged battery when the first discharged battery is received before the second discharged battery.

The memory 204 may include suitable logic, circuitry, interfaces, and/or code, executable by the circuitry, that may be configured to store one or more instructions that are executed by the processor 202, the authentication engine 202a, the battery manager 202b, the configuration engine 202c, the swapping engine 202d, the transceiver 206, and the I/O port 208 to perform their operations. In an exemplary embodiment, the memory 204 may be configured to temporarily store the set of parameters associated with the one or more users such as the user 102. The memory 204 may be further configured to temporarily store the one or more swap requests initiated by the one or more users such as the user 102. The memory 204 may be further configured to temporarily store the battery ID information associated with each discharged battery of one or more vehicles such as the vehicle 106. The memory 204 may be further configured to temporarily store the battery swapping count and the authentication preferences of the one or more users such as the user 102. The memory 204 may be further configured to temporarily store the availability information associated with each battery. The memory 204 may be further configured to temporarily store one or more available charging slots in the charging platform of the charging station 108. The memory 204 may be further configured to temporarily store one or more available storing slots in the storing platform of the charging station 108. Examples of the memory 204 may include, but are not limited to, a random-access memory (RAM), a read-only memory (ROM), a programmable ROM (PROM), and an erasable PROM (EPROM).

The transceiver 206 may include suitable logic, circuitry, interfaces, and/or code, executable by the circuitry, that may be configured to transmit (or receive) data to (or from) various servers or devices, such as the computing device 104, the charging station 108, or the database server 112. Examples of the transceiver 206 may include, but are not limited to, an antenna, a radio frequency transceiver, a wireless transceiver, and a Bluetooth transceiver. The transceiver 206 may be configured to communicate with the computing device 104, the charging station 108, or the database server 112 using various wired and wireless communication protocols, such as TCP/IP, UDP, LTE communication protocols, or any combination thereof.

The I/O port 208 may include suitable logic, circuitry, interfaces, and/or code, executable by the circuitry, that may be configured to perform the one or more operations related to input or output features facilitated to the one or more users such as the user 102. The I/O port 208 may include various input and output devices that are configured to communicate with the processor 202, the memory 204, and the transceiver 206. Examples of the input devices may include a keyboard, a mouse, a joystick, a touchscreen, a microphone, and the like. Examples of the output devices may include a display, a speaker, a headphone, and the like. Various operations of the charging station server 110 along with their advantages and improvements will become apparent in conjunction with FIGS. 3-6, 7A-7E, 8A-8C, and 9A-9C.

Figure 3:
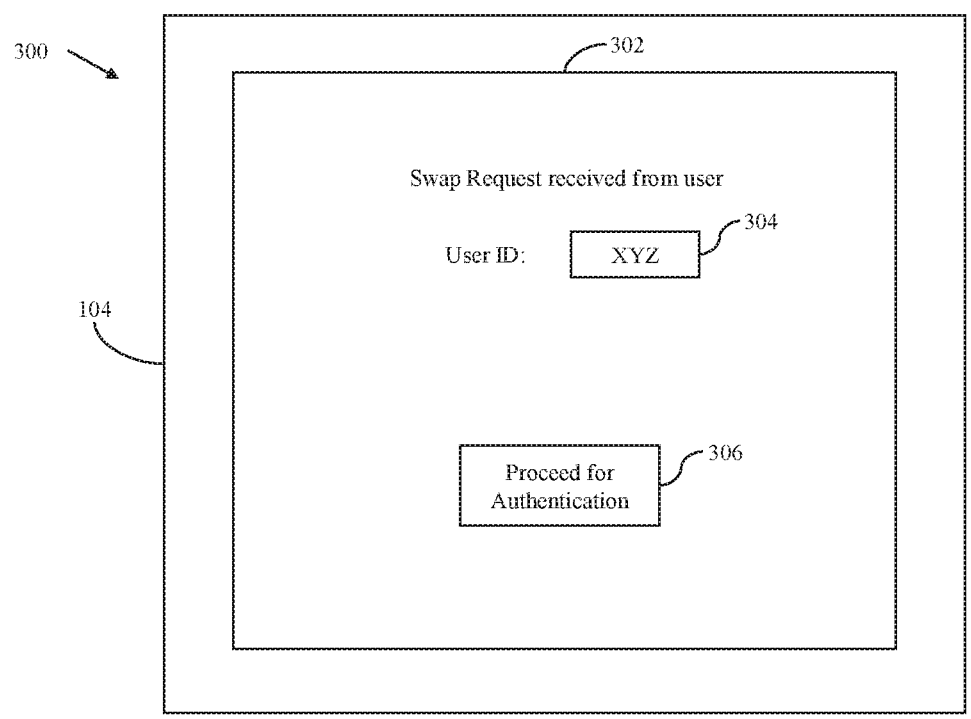
FIG. 3 is a block diagram that illustrates an exemplary user interface rendered on a computing device of the system environment of FIG. 1, in accordance with an exemplary embodiment of the disclosure.

FIG. 3 is a block diagram 300 that illustrates an exemplary user interface 302 rendered on the computing device 104, in accordance with an exemplary embodiment of the disclosure. The user interface 302 may include one or more text displaying sections such as a text box 304 and one or more interactive interface elements such as an interactive interface element 306.

In an embodiment, the charging station server 110 may be configured to render the first user interface such as the user interface 302 on the computing device 104. The user interface 302 may present an indication associated with the reception of the swap request from the user 102. The user interface 302 may include the text box 304 (e.g., a text field) that displays the user ID of the user 102 indicating that the swap request associated with the user 102 has been received from the computing device 104. In an example, the user ID of the user 102 has been displayed as 'XYZ'. The user ID of the user 102 may be a unique user ID generated by the user 102 or provided by the battery swapping service provider to the user 102 at the time of registration with the battery swapping service provider for availing the battery swapping services. The user interface 302 may further include the interactive interface element 306 that is utilized, by the user 102, to provide a consent for proceeding with the authentication process. In an example, the interactive interface element 306 may be a selectable button or tab that is selected by the user 102 to provide the consent. When the consent is provided by the user 102, the charging station server 110 may render the second user interface including the one or more authentication methods as one or more selectable options on the computing device 104, as shown in FIG. 4.

Figure 4:
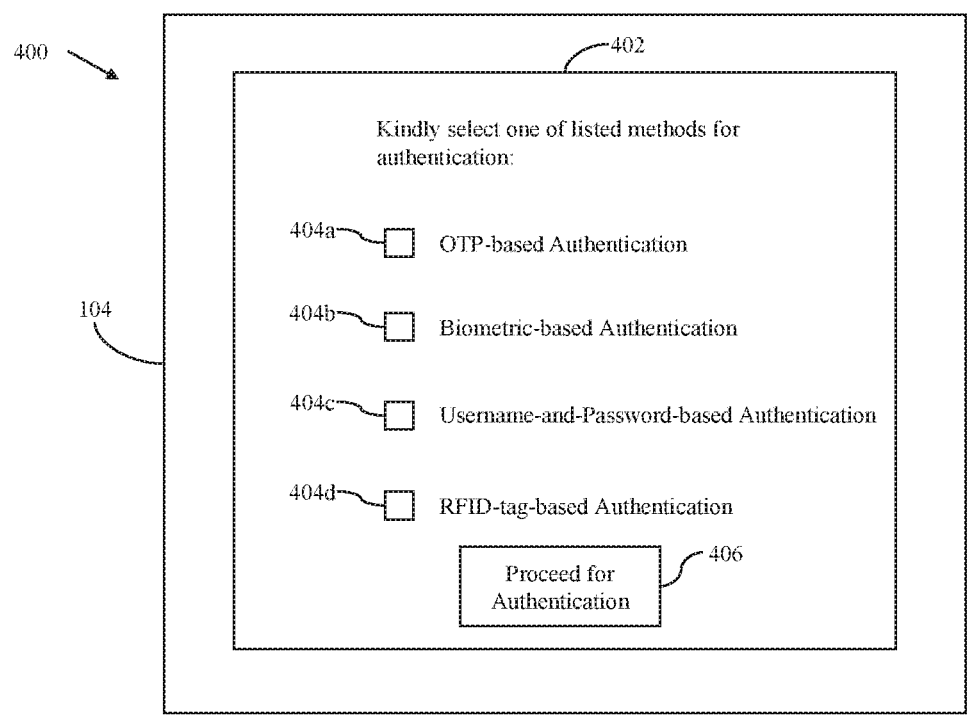
FIG. 4 is a block diagram that illustrates an exemplary user interface rendered on the computing device, in accordance with an exemplary embodiment of the disclosure.

FIG. 4 is a block diagram 400 that illustrates an exemplary user interface 402 rendered on the computing device 104, in accordance with an exemplary embodiment of the disclosure. The user interface 402 may include one or more checkboxes, such as checkboxes 404a-404d, corresponding to the one or more authentication methods. The user interface 402 may further include one or more interactive interface elements such as an interactive interface element 406.

Figure 5:
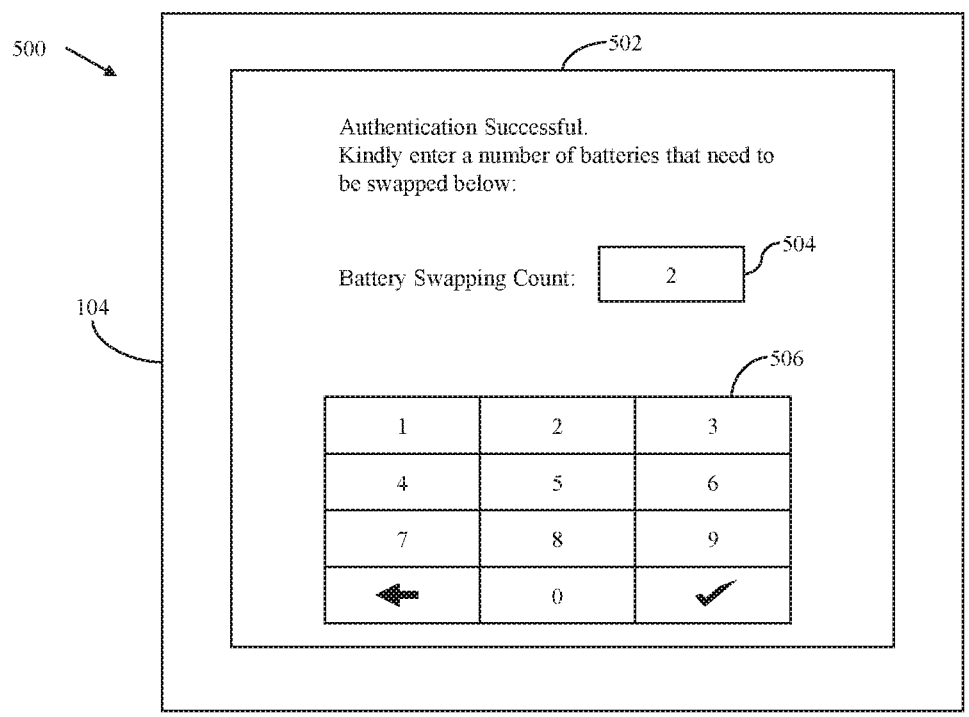
FIG. 5 is a block diagram that illustrates an exemplary user interface rendered on the computing device, in accordance with an exemplary embodiment of the disclosure.

In an embodiment, the charging station server 110 may be configured to render the second user interface such as the user interface 402 on the computing device 104. The user interface 402 may present the one or more authentication methods that are selectable by the user 102. The one or more authentication methods may be presented as selectable options by way of the checkboxes 404a-404d. The checkboxes 404a-404d may be selection checkboxes that are selectable by the user 102 to select a preferred authentication method from the one or more authentication methods for initiating the authentication process. The user interface 402 may further include the interactive interface element 406 that is utilized, by the user 102, to provide a consent for proceeding with the authentication process using the selected authentication method. In an example, the interactive interface element 406 may be a selectable button or tab that is selected by the user 102 to provide the consent. In an exemplary embodiment, the authentication engine 202a may be configured to authenticate the user 102 by utilizing the OTP-based authentication method when the first checkbox 404a and the interactive interface element 406 are selected by the user 102. In another exemplary embodiment, the authentication engine 202a may be configured to authenticate the user 102 by utilizing the biometric-based authentication method when the second checkbox 404b and the interactive interface element 406 are selected by the user 102. In another exemplary embodiment, the authentication engine 202a may be configured to authenticate the user 102 by utilizing the username-and-password-based authentication method when the third checkbox 404c and the interactive interface element 406 are selected by the user 102. In another exemplary embodiment, the authentication engine 202a may be configured to authenticate the user 102 by utilizing the RFID-tag-based authentication method when the fourth checkbox 404d and the interactive interface element 406 are selected by the user 102. Upon successful authentication of the user 102, the charging station server 110 may render the third user interface for obtaining the battery swapping count from the user 102, as shown in FIG. 5. The battery swapping count may indicate a number of discharged batteries of the vehicle 106 that the user 102 wants to swap with charged batteries at the charging station 108.

FIG. 5 is a block diagram 500 that illustrates an exemplary user interface 502 rendered on the computing device 104, in accordance with an exemplary embodiment of the disclosure. The user interface 502 may include one or more input boxes such as an input box 504. The user interface 502 may further include a digital keypad 506 for facilitating input-related features to the user 102.

In an embodiment, the charging station server 110 may be configured to render the third user interface such as the user interface 502 on the computing device 104. The user interface 502 may include the input box 504 that enable the user 102 to input the battery swapping count. In some embodiments, the digital keypad 506 may be utilized, by the user 102, to input the battery swapping count in the input box 504. The digital keypad 506 may include multiple selectable options such as numerals 0-9 options, a backspace option, and a confirm option. In some other embodiments, a voice-based input, a gesture-based input, or any combination thereof may be utilized, by the user 102, to input the battery swapping count in the input box 504. In an example, the user 102 selects the numeral 2 option, followed by the confirm option to provide the battery swapping count as '2'.

Figure 6:
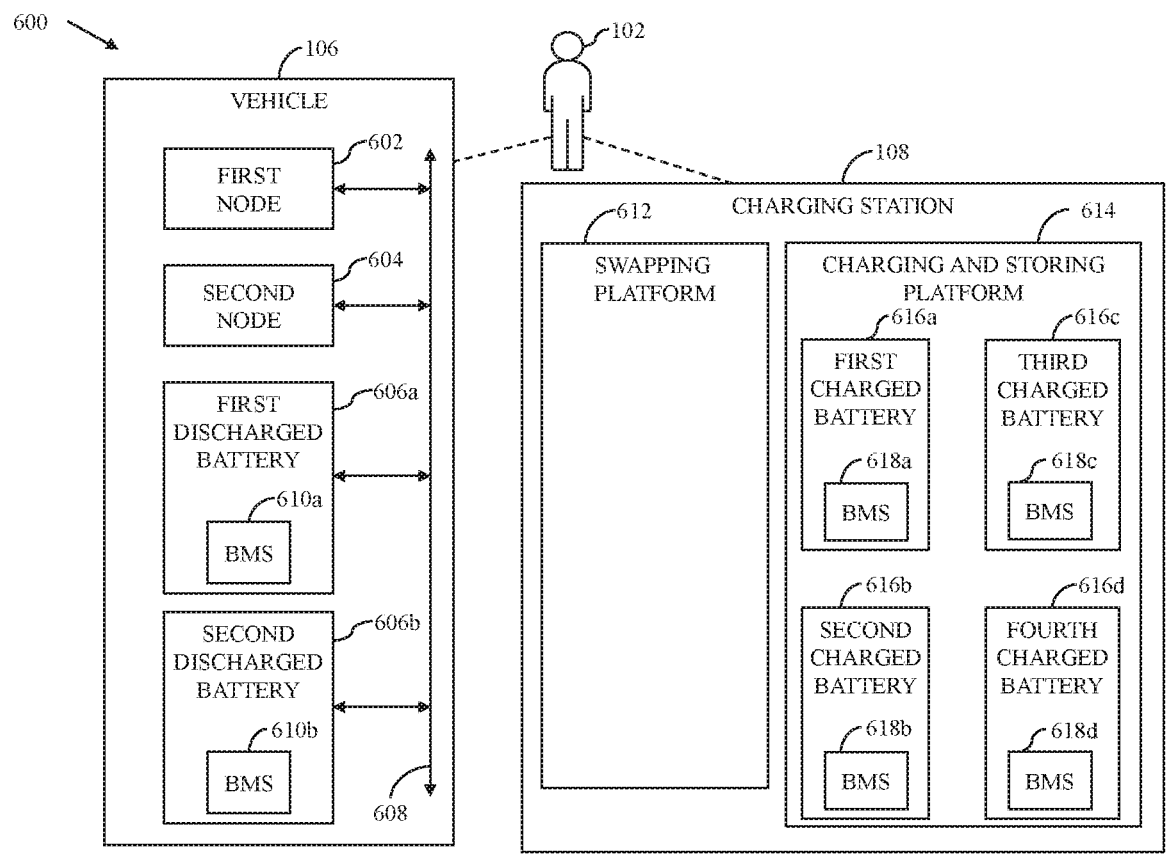
FIG. 6 is a block diagram that illustrates an exemplary scenario for battery swapping between a vehicle and a charging station of the system environment of FIG. 1, in accordance with an exemplary embodiment of the disclosure.

FIG. 6 is a block diagram 600 that illustrates an exemplary scenario for the battery swapping between the vehicle 106 and the charging station 108, in accordance with an exemplary embodiment of the disclosure. The exemplary scenario includes the user 102, the vehicle 106, and the charging station 108.

The vehicle 106 includes a first node 602, a second node 604, a first discharged battery 606a, a second discharged battery 606b, and a CAN bus 608. The first node 602, the second node 604, the first discharged battery 606a, the second discharged battery 606b, and the CAN bus 608 may collectively represent an in-vehicle communication network environment of the vehicle 106. In an example, the first and second discharged batteries 606a and 606b are communicatively coupled to the in-vehicle communication network. The first discharged battery 606a may communicate by way of the first node 602. Other vehicle components such as the vehicle controller may communicate via the second node 604. The first node 602 and the second node 604 communicate with each other via the CAN bus 608. In an embodiment, the vehicle controller is communicatively coupled to the in-vehicle communication network by way of the second node 604. The vehicle controller communicates with the master battery, i.e., the first discharged battery 606a, by way of respective nodes in the in-vehicle communication network to receive information associated with the set of discharged batteries, such as the battery capacity and battery health.

In an embodiment, the first and second discharged batteries 606a and 606b include a BMS 610a and a BMS 610b, respectively, that store respective battery information. In an example, the first discharged battery 606a is configured as a master battery by integrating a first static ID in the BMS 610a and the second discharged battery 606b is configured as a slave battery by integrating a first dynamic ID in the BMS 610b. The user 102 generates the swap request by utilizing the computing device 104 for swapping the set of discharged batteries, i.e., the first and second discharged batteries 606a and 606b, with the set of charged batteries.

The charging station 108 includes the swapping platform (hereinafter, referred to as "the swapping platform 612") and the charging and storing platform (hereinafter, referred to as "the charging and storing platform 614"). The charging and storing platform 614 includes first through fourth charged batteries 616a-616d. The first through fourth charged batteries 616a-616d include BMSs 618a-618d, respectively. After receiving the swap request from the computing device 104 for swapping the first and second discharged batteries 606a and 606b, the set of charged batteries, such as the first and second charged batteries 616a and 616b, is selected from the first through fourth charged batteries 616a-616d by the charging station server 110.

FIGS. 7A-7E are block diagrams that collectively illustrate an exemplary scenario 700 for the battery swapping, in accordance with an exemplary embodiment of the disclosure. In the exemplary scenario 700, the first and second discharged batteries 606a and 606b are swapped one at a time.

Figure 7A:
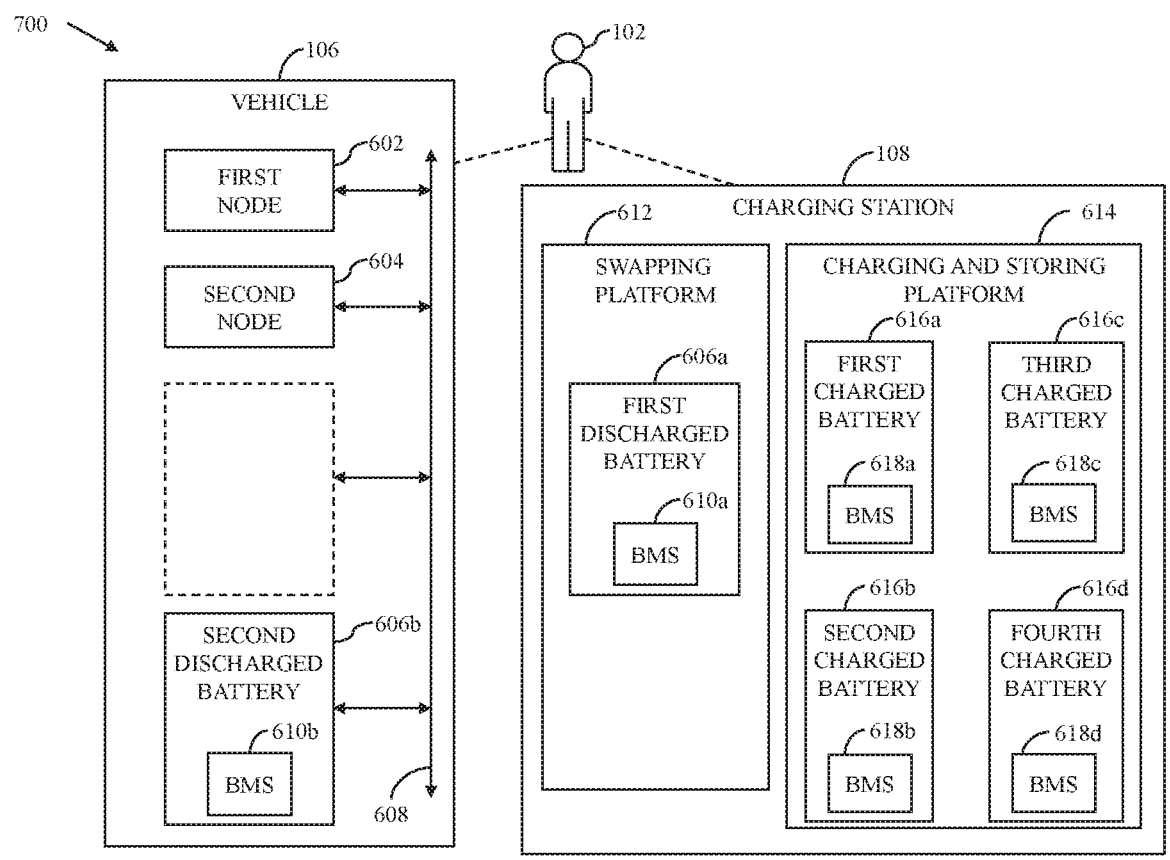
FIGS. 7A-7E are block diagrams that collectively illustrate an exemplary scenario for battery swapping, in accordance with an exemplary embodiment of the disclosure.

Referring now to FIG. 7A, the swapping platform 612 receives the first discharged battery 606a, when the user 102 takes out the first discharged battery 606a from the vehicle 106 and places the first discharged battery 606a onto the swapping platform 612. The swapping platform 612 may be configured to generate and provide an indication indicating the reception of the first discharged battery 606a from the user 102. Upon reception of the indication, the charging station server 110 may be configured to retrieve first battery ID information of the first discharged battery 606a from the BMS 610a and reset the BMS 610a of the first discharged battery 606a. The first battery ID information may include a previously assigned static ID or a previously assigned dynamic ID. In the ongoing example, the first battery ID information includes the first static ID.

The charging station server 110 may be configured to determine whether the first discharged battery 606a is configured as a master or a slave battery based on the first battery ID information. In the ongoing example, the charging station server 110 determines that the first discharged battery 606a is configured as a master battery based on the first static ID. Upon the determination, the charging station server 110 may be configured to select the first subset of charged batteries including at least the first charged battery 616a to be configured as a master battery from the set of charged batteries, i.e., the first and second charged batteries 616a and 616b. The charging station server 110 may be configured to assign the first static ID to the first charged battery 616a and configure the first charged battery 616a as the master battery by integrating the first static ID in the BMS 618a of the first charged battery 616a.

Figure 7B:
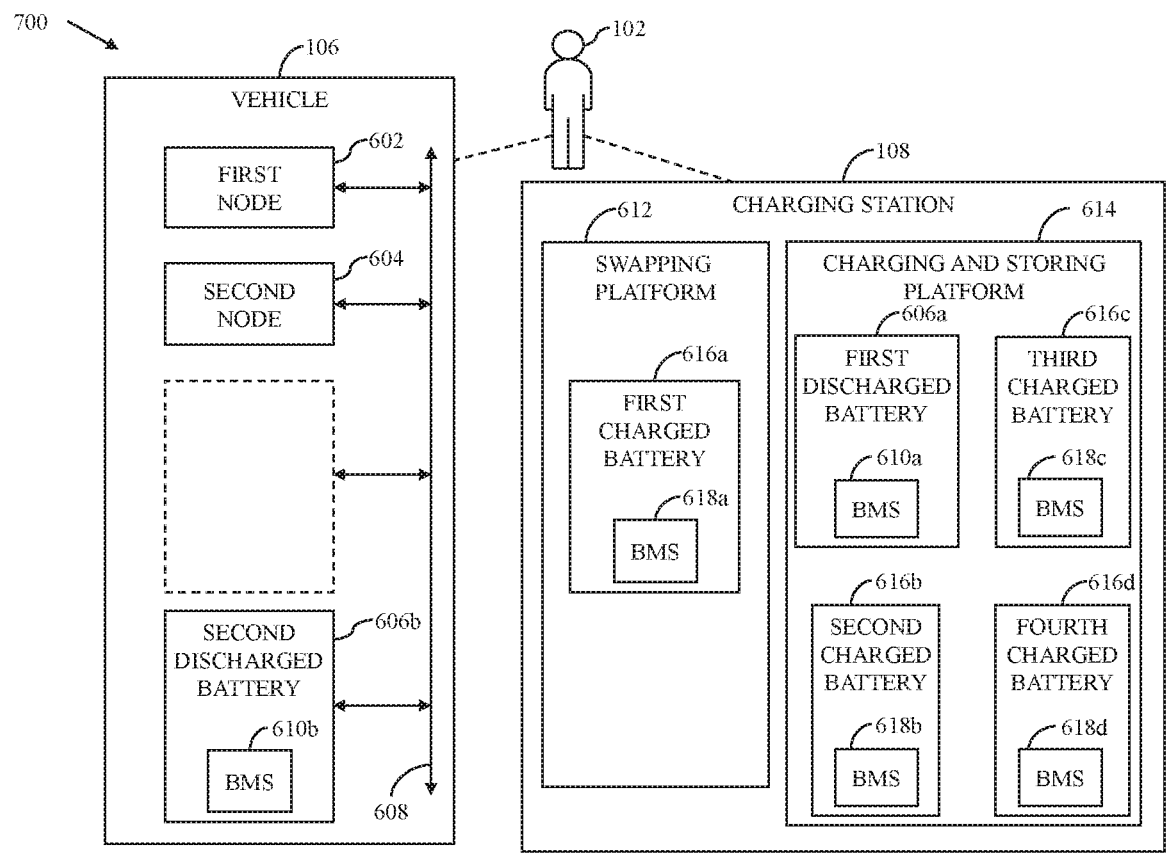

Referring now to FIG. 7B, the charging station server 110 may be configured to release the first charged battery 616a from the charging and storing platform 614 to the swapping platform 612. The first discharged battery 606a at the swapping platform 612 is swapped with the first charged battery 616a at the charging and storing platform 614. In an exemplary scenario, the charging station server 110 may perform the swapping by facilitating the transportation of the first charged battery 616a from the charging and storing platform 614 to the swapping platform 612 and the transportation of the first discharged battery 606a from the swapping platform 612 to the charging and storing platform 614.

Figure 7C:
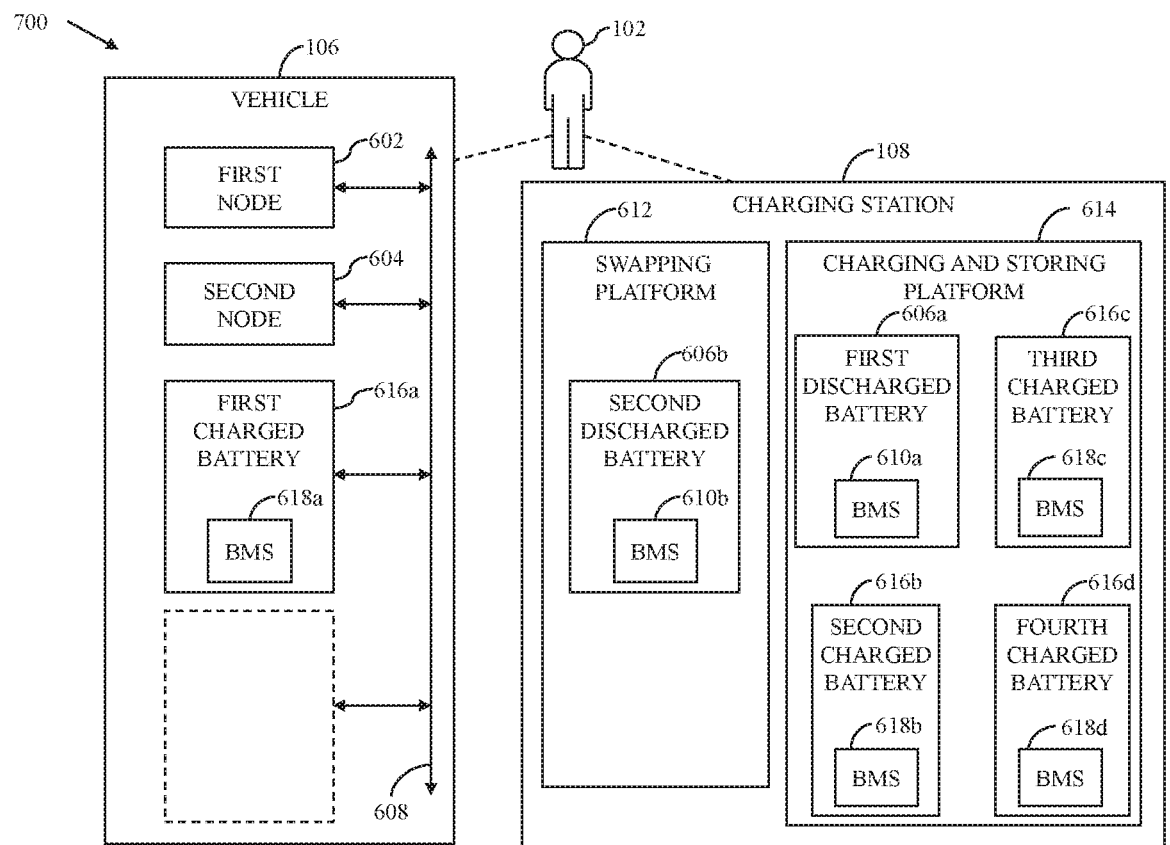

Referring now to FIG. 7C, the first charged battery 616a is installed in the vehicle 106 by the user 102. The first charged battery 616a may be communicatively coupled to the first node 602 of the in-vehicle communication network, and accordingly, the first charged battery 616a may be configured to communicate with other devices (such as the vehicle controller) and other charged batteries installed in the vehicle 106. In an embodiment, the first charged battery 616a may be configured to broadcast the first static ID in the in-vehicle communication network via the CAN bus 608. The first static ID may facilitate the communication between the first charged battery 616a and the vehicle controller.

Further, the swapping platform 612 may receive the second discharged battery 606b, when the user 102 takes out the second discharged battery 606b from the vehicle 106 and places the second discharged battery 606b onto the swapping platform 612. The swapping platform 612 may be configured to generate and provide an indication indicating the reception of the second discharged battery 606b from the user 102. Upon reception of the indication, the charging station server 110 may be configured to retrieve second battery ID information of the second discharged battery 606b from the BMS 610b and reset the BMS 610b of the second discharged battery 606b. The second battery ID information may include a previously assigned static ID or a previously assigned dynamic ID. In the ongoing example, the second battery ID information includes the first dynamic ID.

The charging station server 110 may be configured to determine whether the second discharged battery 606b is configured as a master or a slave battery based on the second battery ID information. In the ongoing example, the charging station server 110 determines that the second discharged battery 606b is configured as a slave battery based on the first dynamic ID. Upon the determination, the charging station server 110 may be configured to select the second subset of charged batteries including at least the second charged battery 616b to be configured as a slave battery from remaining charged batteries of the set of charged batteries, i.e., the second charged battery 616b. The charging station server 110 may be configured to assign the first dynamic ID to the second charged battery 616b and configure the second charged battery 616b as the slave battery by integrating the first dynamic ID in the BMS 618b of the second charged battery 616b.

Figure 7D:
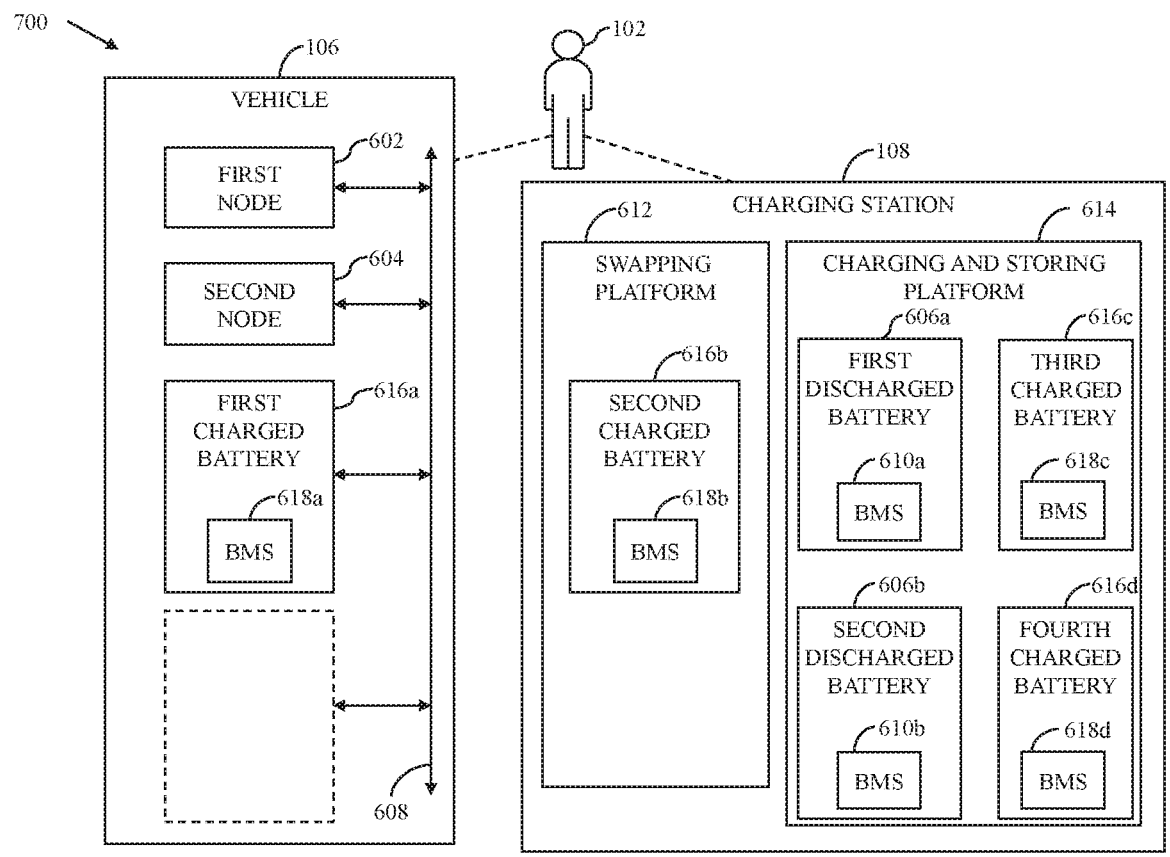

Referring now to FIG. 7D, the charging station server 110 may be configured to release the second charged battery 616b from the charging and storing platform 614 to the swapping platform 612. The second discharged battery 606b at the swapping platform 612 is swapped with the second charged battery 616b at the charging and storing platform 614. In an exemplary scenario, the charging station server 110 may perform the swapping by facilitating the transportation of the second charged battery 616b from the charging and storing platform 614 to the swapping platform 612 and the transportation of the second discharged battery 606b from the swapping platform 612 to the charging and storing platform 614.

Figure 7E:
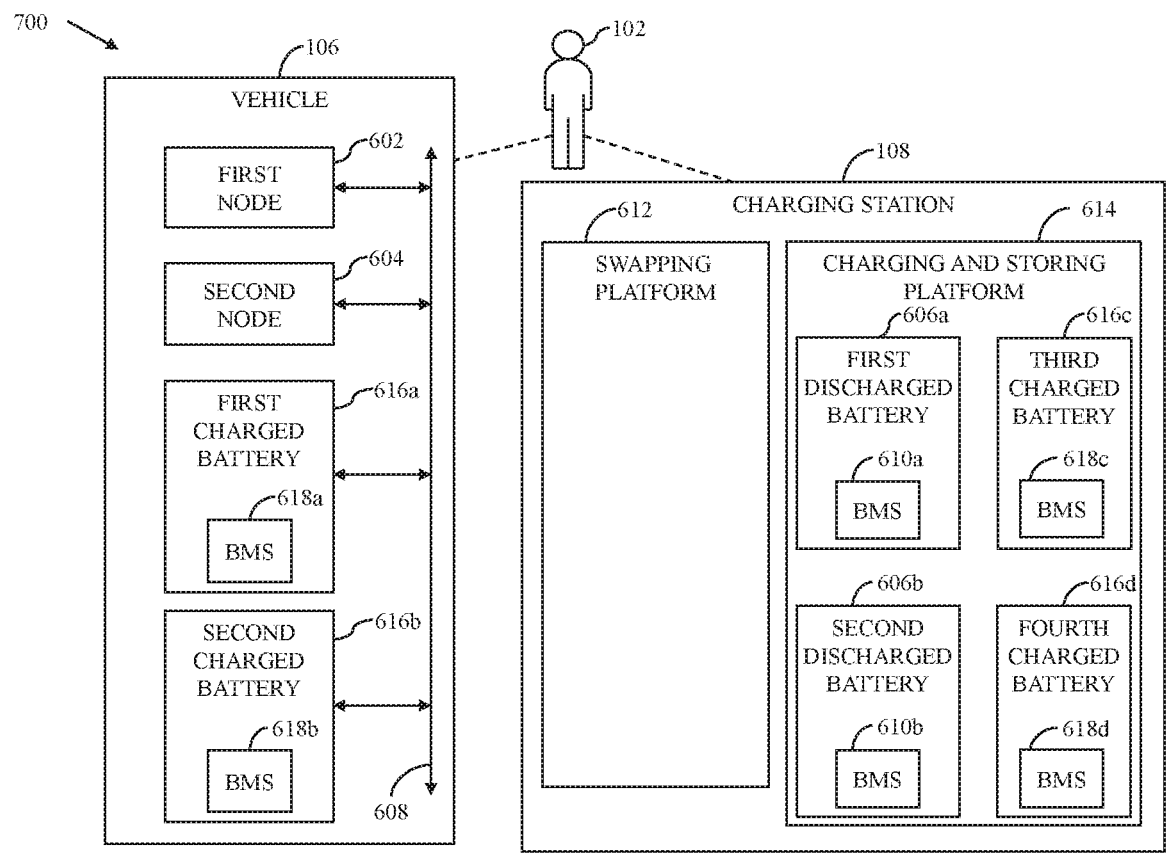

Referring now to FIG. 7E, the second charged battery 616b is installed in the vehicle 106 by the user 102. The second charged battery 616b may be communicatively coupled to the in-vehicle communication network, and accordingly, the second charged battery 616b may be configured to communicate with other charged batteries (such as the first charged battery 616a) installed in the vehicle 106. In an embodiment, the first dynamic ID may facilitate the communication between the second charged battery 616b and the first charged battery 616a.

Thus, as described above, the first and second discharged batteries 606a and 606b are swapped with the first and second charged batteries 616a and 616b and the in-vehicle battery communication is managed by way of the first static ID and first dynamic ID assigned to the first and second charged batteries 616a and 616b, respectively.

Figure 8A:
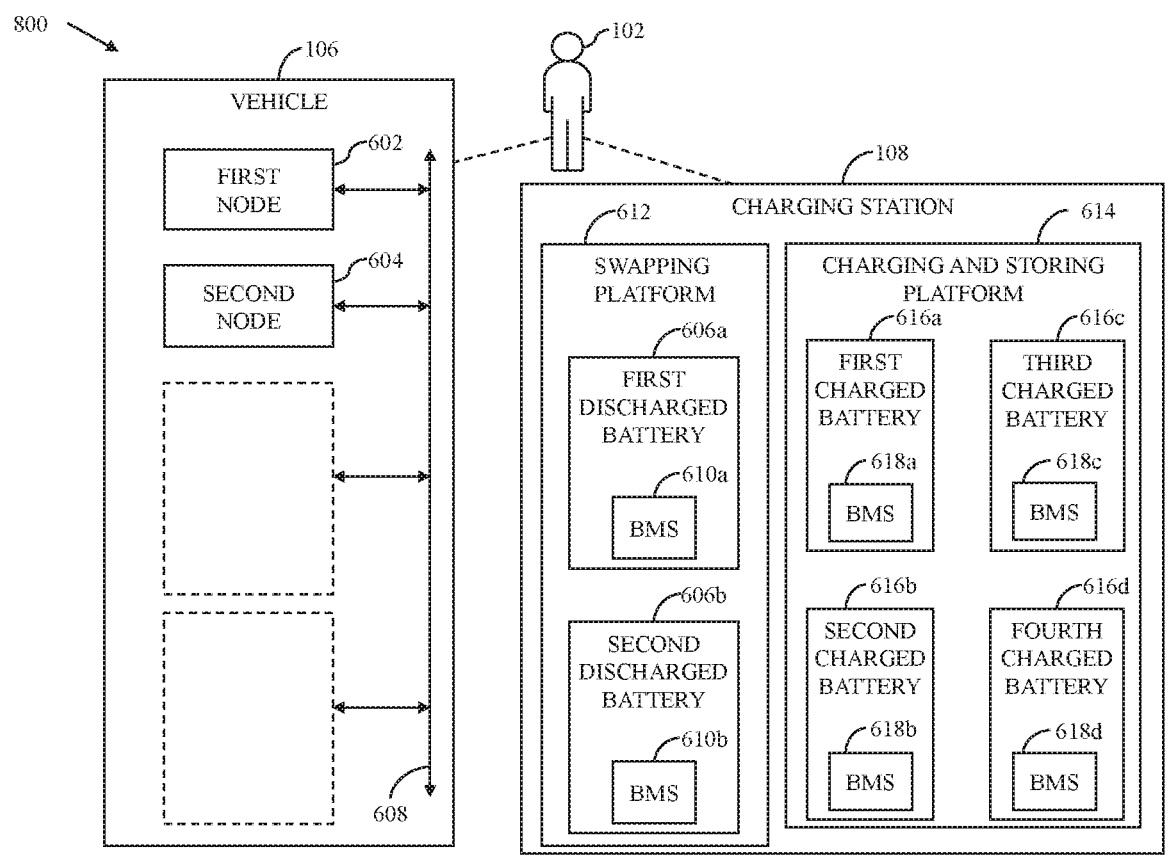
FIGS. 8A-8C are block diagrams that collectively illustrate an exemplary scenario for battery swapping, in accordance with another exemplary embodiment of the disclosure.
Figure 8B:
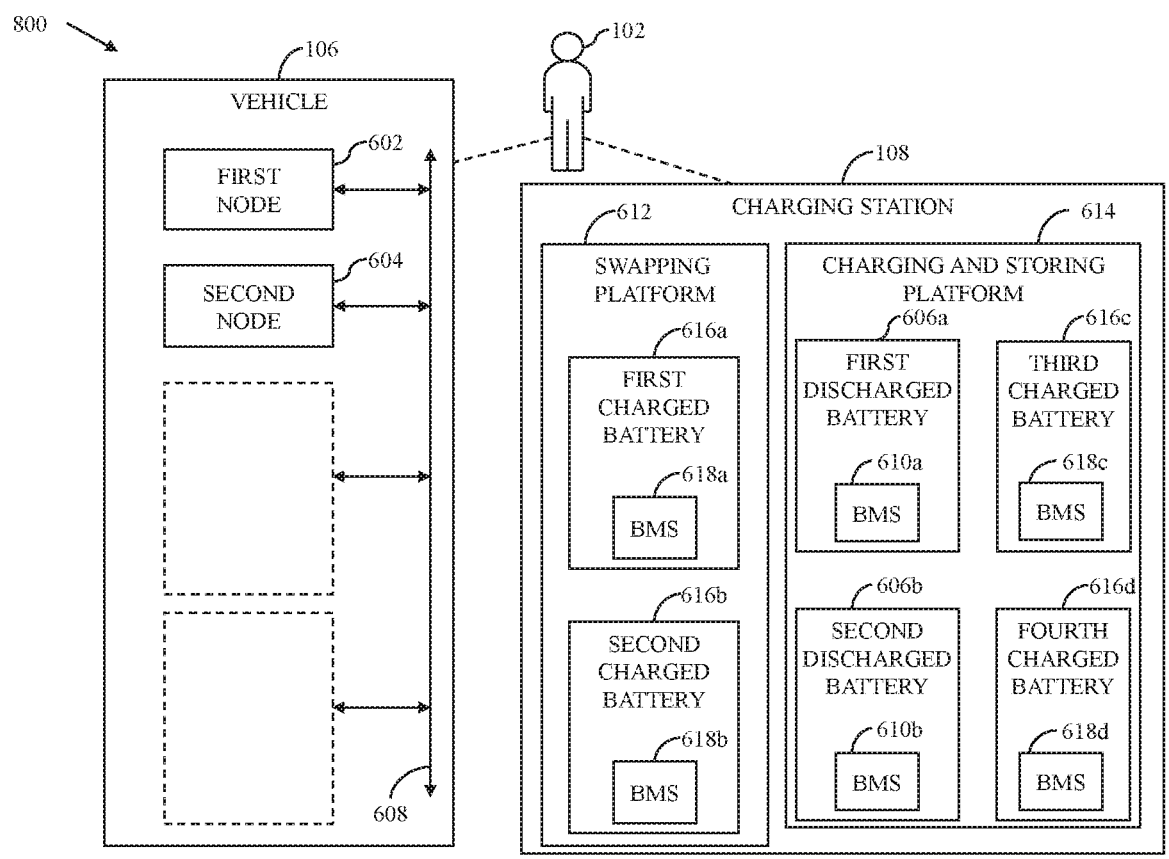
Figure 8C:
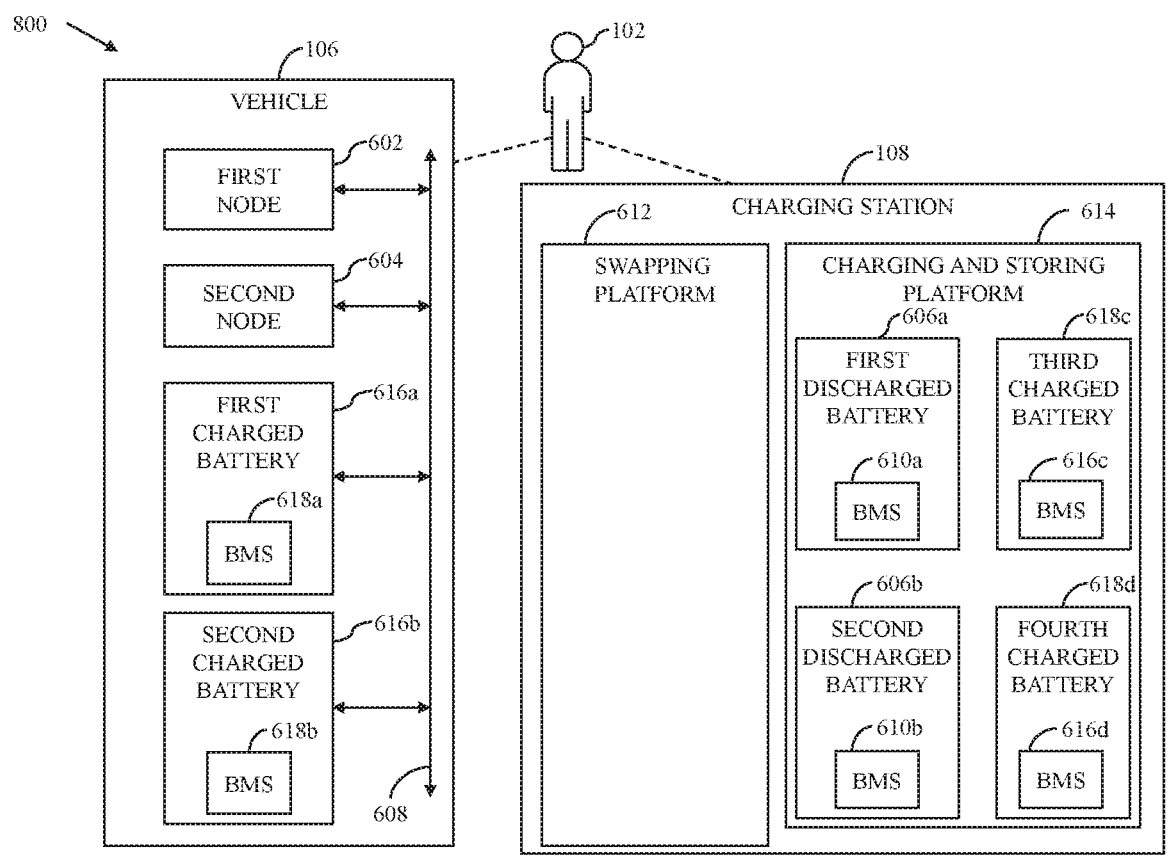

FIGS. 8A-8C are block diagrams that collectively illustrate an exemplary scenario 800 for the battery swapping, in accordance with another exemplary embodiment of the disclosure. In the exemplary scenario 800, the first and second discharged batteries 606a and 606b are swapped at the same time instance.

Referring now to FIG. 8A, the swapping platform 612 receives the first and second discharged batteries 606a and 606b, when the user 102 takes out the first and second discharged batteries 606a and 606b from the vehicle 106 and places the first and second discharged batteries 606a and 606b onto the swapping platform 612. The swapping platform 612 may be configured to generate and provide an indication indicating the reception of the first and second discharged batteries 606a and 606b from the user 102. Upon reception of the indication, the charging station server 110 may be configured to retrieve first and second battery ID information of the first and second discharged batteries 606a and 606b from the BMS 610a and the BMS 610b, respectively, and reset the BMS 610a and the BMS 610b of the first and second discharged batteries 606a and 606b. The first and second battery ID information may include a previously assigned static or dynamic ID. In the ongoing example, the first battery ID information includes the first static ID and the second battery ID information includes the first dynamic ID.

The charging station server 110 may be configured to determine whether the first and second discharged batteries 606a and 606b are configured as a master or a slave battery based on the first and second battery ID information. In the ongoing example, the charging station server 110 determines that the first discharged battery 606a is configured as a master battery based on the first static ID and the second discharged battery 606b is configured as a slave battery based on the first dynamic ID. Upon the determination, the charging station server 110 may be configured to select the first and second subsets of charged batteries including at least the first charged battery 616a and the second charged battery 616b to be configured as a master battery and a slave battery, respectively, from the set of charged batteries, i.e., the first and second charged batteries 616a and 616b. The charging station server 110 may be configured to assign the first static ID and the first dynamic ID to the first and second charged batteries 616a and 616b, respectively. Further, the charging station server 110 may be configured to configure the first and second charged batteries 616a and 616b as the master battery and the slave battery by integrating the first static ID and the first dynamic ID in the BMS 618*a* and the BMS 618*b* of the first and second charged batteries 616*a* and 616*b*, respectively.

Referring now to FIG. 8B, the charging station server 110 may be configured to release the first and second charged batteries 616*a* and 616*b* from the charging and storing platform 614 to the swapping platform 612. The first and second discharged batteries 606*a* and 606*b* at the swapping platform 612 are swapped with the first and second charged batteries 616*a* and 616*b* at the charging and storing platform 614, respectively. In an exemplary scenario, the charging station server 110 may perform the swapping by facilitating the transportation of the first and second charged batteries 616*a* and 616*b* from the charging and storing platform 614 to the swapping platform 612 and the transportation of the first and second discharged batteries 606*a* and 606*b* from the swapping platform 612 to the charging and storing platform 614.

Referring now to FIG. 8C, the first and second charged batteries 616*a* and 616*b* are installed in the vehicle 106 by the user 102. The first and second charged batteries 616*a* and 616*b* may be communicatively coupled to the in-vehicle communication network. Accordingly, the first charged battery 616*a* may be configured to communicate with other devices (such as the vehicle controller) and other charged batteries installed in the vehicle 106 via the first node 602 and the second charged battery 616*b* may be configured to communicate with other charged batteries (such as the first charged battery 616*a*) installed in the vehicle 106 in-vehicle communication network. In an embodiment, the first charged battery 616*a* may be configured to broadcast the first static ID in the in-vehicle communication network via the CAN bus 608. The first static ID may facilitate the communication between the first charged battery 616*a* and the vehicle controller. The first dynamic ID may facilitate the communication between the second charged battery 616*b* and the first charged battery 616*a*.

Thus, as described above, the first and second discharged batteries 606*a* and 606*b* are swapped with the first and second charged batteries 616*a* and 616*b* and the in-vehicle battery communication is managed by way of the first static ID and first dynamic ID assigned to the first and second charged batteries 616*a* and 616*b*, respectively.

Figure 9A:
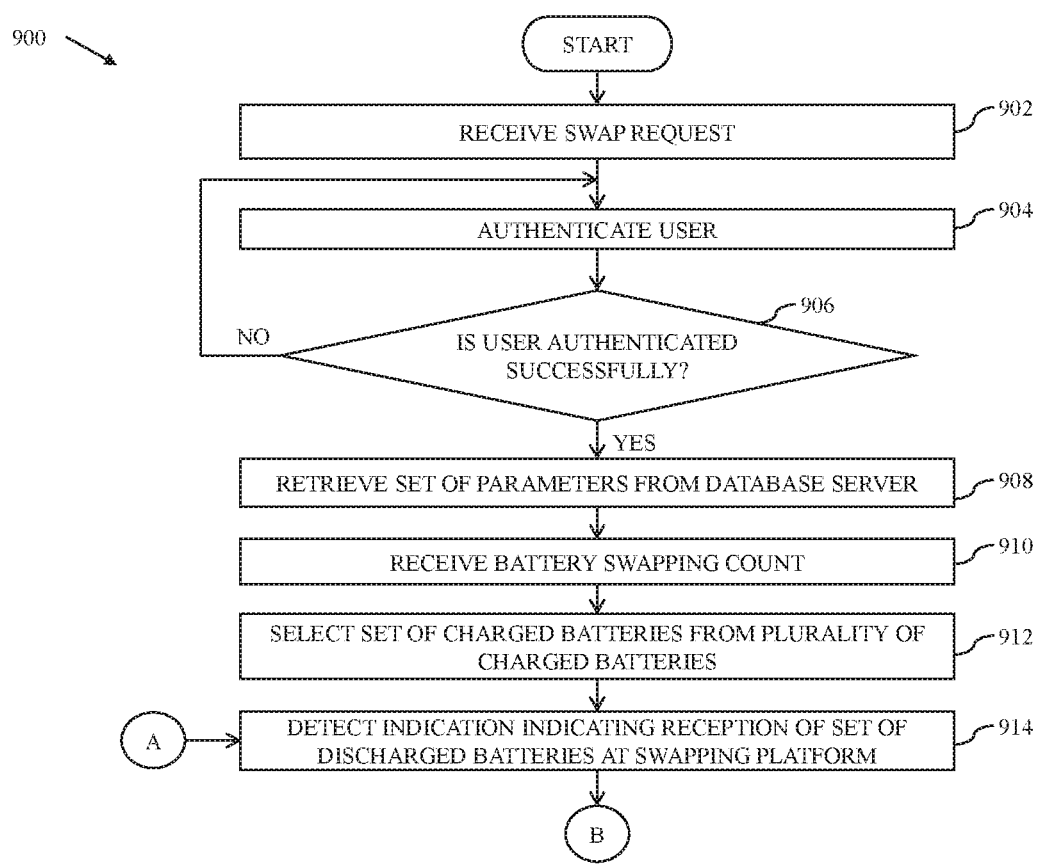
FIGS. 9A-9C, collectively, illustrate a flow chart of a method for battery swapping, in accordance with an exemplary embodiment of the disclosure.
Figure 9B:
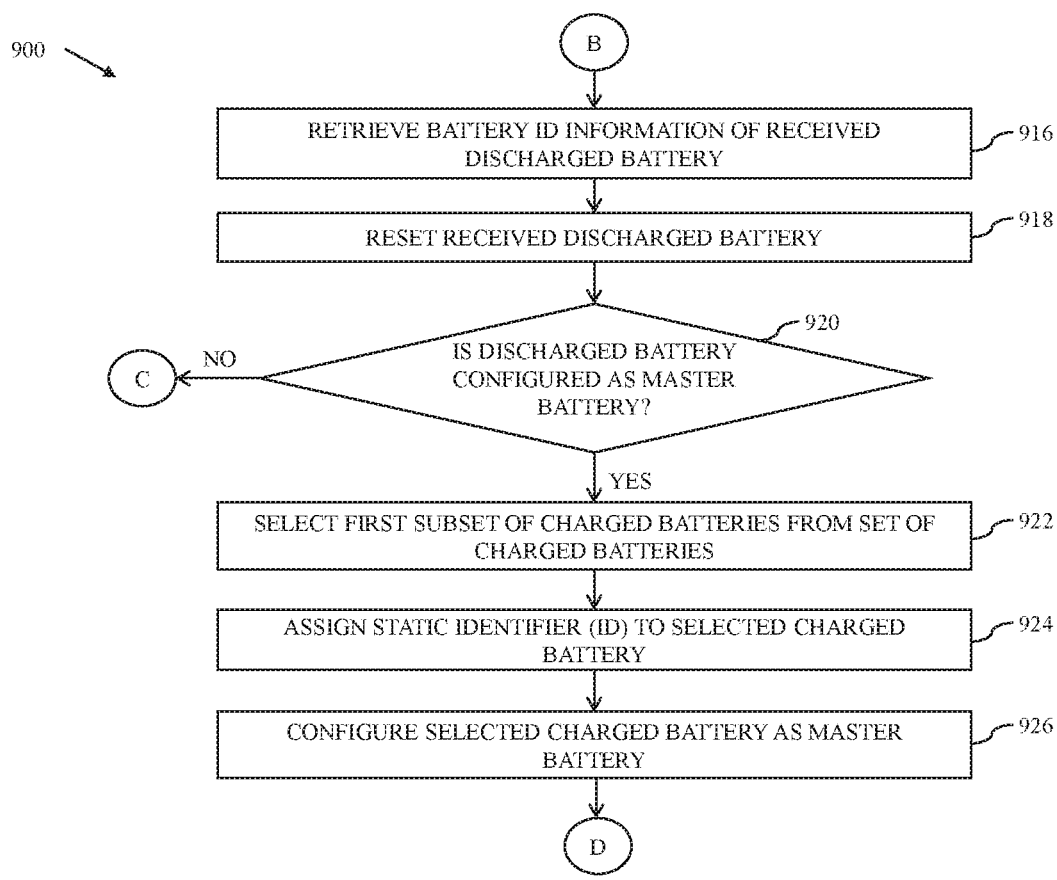
Figure 9C:
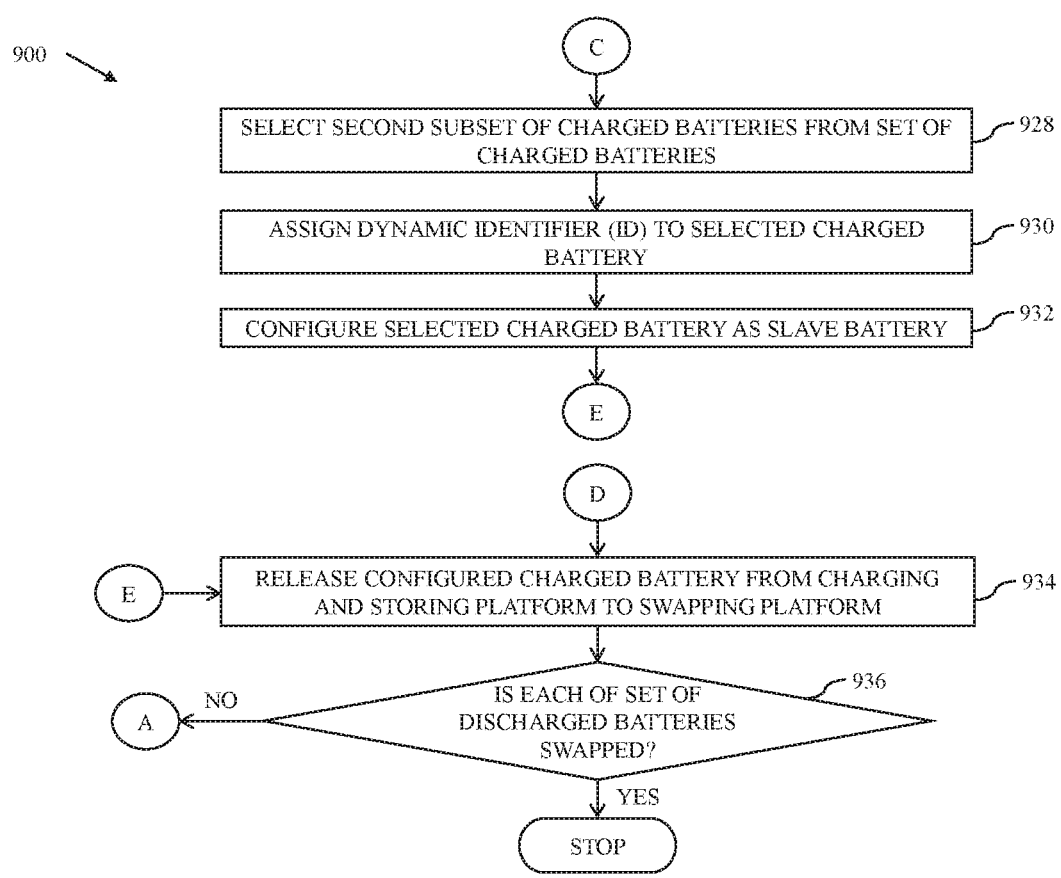

FIGS. 9A-9C, collectively, illustrate a flow chart 900 of a method for the battery swapping, in accordance with an exemplary embodiment of the disclosure.

At 902, the swap request is received. In an embodiment, the charging station server 110 may be configured to receive the swap request from the computing device 104 via the communication network 114. The swap request may be received for swapping the set of discharged batteries (such as the first and second discharged batteries 606*a* and 606*b*) in the vehicle 106 with the set of charged batteries (such as the first and second charged batteries 616*a* and 616*b*) available at the charging station 108. The swap request may include at least the user ID of the user 102.

At 904, the user 102 is authenticated. In an embodiment, the charging station server 110 may be configured to authenticate the user 102 by one of the one or more authentication methods upon reception of the swap request. The authentication of the user 102 may be performed based on the consent of the user 102. The consent may be provided by the user 102 by utilizing the user interfaces 302 and/or 402 rendered on the computing device 104.

At 906, it is determined whether the user 102 is successfully authenticated. In an embodiment, the charging station server 110 may be configured to perform a check to determine whether the user 102 is successfully authenticated. If at 906, it is determined that the user 102 is not successfully authenticated, then 904 is executed again. If at 906, it is determined that the user 102 is successfully authenticated, then 908 is executed.

At 908, the set of parameters are retrieved from the database server 112. In an embodiment, based on the successful authentication of the user 102, the charging station server 110 may be configured to retrieve the set of parameters associated with the user 102 from the database server 112. The set of parameters may include at least one of the user profile information, the vehicle information, or the battery count information. The set of parameters may also include other battery-related information such as the battery type, the battery capacity, the battery health, or the like.

At 910, the battery swapping count is received. In an embodiment, the charging station server 110 may be configured to receive the battery swapping count from the computing device 104. The battery swapping count may be provided by the user 102 by utilizing the user interface 502 rendered on the computing device 104.

At 912, the set of charged batteries is selected from the plurality of charged batteries. In an embodiment, based on at least the battery swapping count, the charging station server 110 may be configured to select the set of charged batteries from the plurality of charged batteries (such as the first through fourth charged batteries 616*a*-616*d*) that are available at the charging station 108 for swapping with the set of discharged batteries.

At 914, the indication indicating the reception of the set of discharged batteries at the swapping platform 612 is detected. In an embodiment, the charging station server 110 may be configured to detect the indication indicating the reception of the set of discharged batteries including at least one battery (such as the first or second discharged battery 606*a* or 606*b*) at the swapping platform 612.

At 916, the battery ID information of the received discharged battery is retrieved. In an embodiment, based on the detection, the charging station server 110 may be configured to retrieve the battery ID information (such as the first battery ID information) that includes at least one of the previously assigned static or dynamic ID from a BMS (such as the BMS 610*a*) of the received discharged battery (such as the first discharged battery 606*a*) for which the swapping is currently being performed. At 918, the received discharged battery is reset. After retrieving the battery ID information such as the first battery ID information, the charging station server 110 may be configured to reset the received discharged battery such as the first discharged battery 606*a*.

At 920, it is determined whether the received discharged battery is configured as a master battery. In an embodiment, the charging station server 110 may be configured to perform a check to determine whether the received discharged battery (such as the first discharged battery 606*a*) is configured as the master battery based on the retrieved battery ID information (such as the first battery ID information). If at 920, it is determined that the received discharged battery is configured as the master battery, then 922 is executed. If at 920, it is determined that the received discharged battery is not configured as the master battery, then 928 is executed.

At 922, the first subset of charged batteries is selected from the set of charged batteries. In an embodiment, the charging station server 110 may be configured to select the first subset of charged batteries including at least the first charged battery 616*a* to be configured as the master battery from the set of charged batteries.

At 924, a static ID (such as the first static ID) is assigned to the selected charged battery (such as the first charged battery 616a). In an embodiment, the charging station server 110 may be configured to assign the first static ID to the first charged battery 616a. At 926, the selected charged battery (such as the first charged battery 616a) is configured as the master battery. In an embodiment, the charging station server 110 may be configured to configure the first charged battery 616a as the master battery by integrating the first static ID and the dynamic IDs of each slave battery in the BMS 618a of the first charged battery 616a.

At 928, the second subset of charged batteries is selected from the set of charged batteries. In an embodiment, the charging station server 110 may be configured to select the second subset of charged batteries including at least the second charged battery 616b to be configured as the slave battery from the set of charged batteries. At 930, a dynamic ID (such as the first dynamic ID) is assigned to the selected charged battery (such as the second charged battery 616b). In an embodiment, the charging station server 110 may be configured to assign the first dynamic ID to the second charged battery 616b. At 932, the selected charged battery (such as the second charged battery 616b) is configured as the slave battery. In an embodiment, the charging station server 110 may be configured to configure the second charged battery 616b as the slave battery by integrating the first dynamic ID in the BMS 618b of the second charged battery 616b. After 926 or 932, 934 is executed.

At 934, the configured charged battery is released from the charging and storing platform 614 to the swapping platform 612. In an embodiment, the charging station server 110 may be configured to release the configured charged battery (such as the first or the second charged battery 616a or 616b) from the charging and storing platform 614 to the swapping platform 612 for performing the battery swapping by the user 102. At 936, it is determined whether each of the set of discharged batteries is swapped. In an embodiment, the charging station server 110 may be configured to determine whether each of the set of discharged batteries requested by the user 102 is swapped. If at 936, it is determined that each of the set of discharged batteries is not swapped, then the process goes to 914, and 914 through 936 are executed again for a next discharged battery received at the swapping platform 612. If at 936, it is determined that each of the set of discharged batteries is swapped, then the battery swapping process for the vehicle 106 initiated by the user 102 ends.

Figure 10:
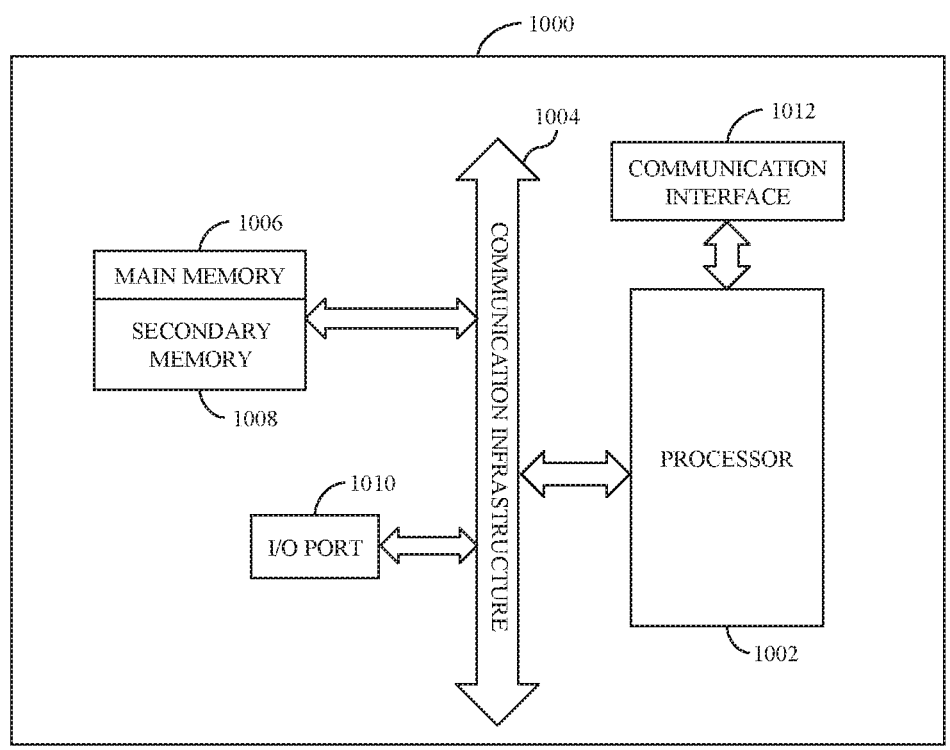
FIG. 10 is a block diagram that illustrates a system architecture of a computer system for battery swapping, in accordance with an exemplary embodiment of the disclosure.

FIG. 10 is a block diagram that illustrates a system architecture of a computer system 1000 for battery swapping, in accordance with an exemplary embodiment of the disclosure. An embodiment of the disclosure, or portions thereof, may be implemented as computer readable code on the computer system 1000. In one example, the charging station server 110 and the database server 112 of FIG. 1 may be implemented in the computer system 1000 using hardware, software, firmware, non-transitory computer readable media having instructions stored thereon, or a combination thereof and may be implemented in one or more computer systems or other processing systems. Hardware, software, or any combination thereof may embody modules and components used to implement the battery swapping method of FIGS. 9A-9C.

The computer system 1000 may include a processor 1002 that may be a special purpose or a general-purpose processing device. The processor 1002 may be a single processor, multiple processors, or combinations thereof. The processor 1002 may have one or more processor "cores." Further, the processor 1002 may be coupled to a communication infrastructure 1004, such as a bus, a bridge, a message queue, multi-core message-passing scheme, the communication network 114, or the like. The computer system 1000 may further include a main memory 1006 and a secondary memory 1008. Examples of the main memory 1006 may include RAM, ROM, and the like. The secondary memory 1008 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 1000 may further include an input/output (I/O) port 1010 and a communication interface 1012. The I/O port 1010 may include various input and output devices that are configured to communicate with the processor 1002. Examples of the input devices may include a keyboard, a mouse, a joystick, a touchscreen, a microphone, and the like. Examples of the output devices may include a display, a speaker, headphones, and the like. The communication interface 1012 may be configured to allow data to be transferred between the computer system 1000 and various devices that are communicatively coupled to the computer system 1000. Examples of the communication interface 1012 may include a modem, a network interface, i.e., an Ethernet card, a communication port, and the like. Data transferred via the communication interface 1012 may be signals, such as electronic, electromagnetic, optical, or other signals as will be apparent to a person skilled in the art. The signals may travel via a communications channel, such as the communication network 114, which may be configured to transmit the signals to the various devices that are communicatively coupled to the computer system 1000. Examples of the communication channel may include a wired, wireless, and/or optical medium such as cable, fiber optics, a phone line, a cellular phone link, a radio frequency link, and the like. The main memory 1006 and the secondary memory 1008 may refer to non-transitory computer readable mediums that may provide data that enables the computer system 1000 to implement the battery swapping method illustrated in FIGS. 9A-9C.

Various embodiments of the disclosure provide the charging station server 110 for battery swapping. The charging station server 110 may be configured to receive, from the computing device 104 via the communication network 114, the swap request for swapping the set of discharged batteries in the vehicle 106 with the set of charged batteries at the charging station 108. The charging station server 110 may be further configured to select the set of charged batteries from the multiple charged batteries available at the charging station 108 for swapping based on at least the battery swapping count provided by the user 102. The charging station server 110 may be further configured to assign at least one of the static or dynamic ID to each of the set of charged batteries including the first and second subsets of charged batteries. Each of the first subset of charged batteries is configured as a master battery by integrating at least the respective static ID in the BMS of each of the first subset of charged batteries and each of the second subset of charged batteries is configured as a slave battery by integrating at least the respective dynamic ID in the BMS of each of the second subset of charged batteries. The static and dynamic IDs are assigned and integrated for facilitating the in-vehicle battery communication. Further, the charging station server 110 may be further configured to release the set of charged batteries from the charging and storing platform 614 to the swapping platform 612 for swapping the set of discharged batteries with the set of charged batteries.

Various embodiments of the disclosure provide a non-transitory computer readable medium having stored thereon, computer executable instructions, which when executed by a computer, cause the computer to execute operations for the battery swapping. The operations include receiving, by the charging station server 110, from the computing device 104 via the communication network 114, the swap request for swapping the set of discharged batteries in the vehicle 106 with the set of charged batteries available at the charging station 108. The operations further include selecting, by the charging station server 110, the set of charged batteries from the multiple charged batteries available at the charging station 108 for swapping based on at least the battery swapping count provided by the user 102. The operations further include assigning, by the charging station server 110, at least one of the static or dynamic ID to each of the set of charged batteries including the first and second subsets of charged batteries. Each of the first subset of charged batteries is configured as a master battery by integrating at least the respective static ID in the BMS of each of the first subset of charged batteries and each of the second subset of charged batteries is configured as a slave battery by integrating at least the respective dynamic ID in the BMS of each of the second subset of charged batteries. The static and dynamic IDs are assigned and integrated for facilitating the in-vehicle battery communication. The operations further include releasing, by the charging station server 110, the set of charged batteries from the charging and storing platform 614 to the swapping platform 612 for swapping the set of discharged batteries with the set of charged batteries.

The disclosed embodiments encompass numerous advantages. Exemplary advantages of the methods and the systems include providing the battery swapping for managing the in-vehicle battery communication. The disclosed battery swapping methods and systems may facilitate an alternative method for assigning at least one of the static ID (such as the first static ID) or the dynamic ID (such as the first dynamic ID) to each charged battery (such as, the first charged battery 616a) being swapped with a discharged battery (such as, the first discharged battery 606a). Further, automatic assigning of at least one the static or dynamic ID to each charged battery helps to eliminate manual assignment of the static or dynamic ID by the user 102. Thus, time required for swapping the set of discharged batteries with the set of charged batteries is reduced compared to the conventional swapping techniques. Also, each charged battery is configured as a master or a slave battery by integrating the respective static or dynamic ID in a BMS (such as, the BMS 618a) of each charged battery to facilitate communication in the in-vehicle communication network. Further, the static and dynamic IDs are assigned based on the battery ID information (such as, the first battery ID information) retrieved from a BMS (such as, the BMS 610a) of each discharged battery. Thus, a need for the user 102 to configure each charged battery as a master battery or a slave battery based on the battery ID information is eliminated, thereby reducing a time required and complexity of assigning the static and dynamic IDs compared to conventional techniques. Also, as the set of discharged batteries is swapped with the configured set of charged batteries and installed in the vehicle 106, the configured set of charged batteries may be capable of communicating in the in-vehicle communication network without any requirement of manual configuration by the user 102. Thus, the disclosed battery swapping methods and systems eliminate manual configuration of the charged batteries, reduce an overall time of swapping the set of discharged batteries, and manage the in-vehicle battery communication.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for the battery swapping. While various exemplary embodiments of the disclosed battery swapping systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A battery swapping method for managing in-vehicle battery communication, the method comprising:
receiving, by a charging station server from a computing device, a swap request for swapping a set of discharged batteries in a vehicle with a set of charged batteries available at a charging station;
selecting, by the charging station server, the set of charged batteries from a plurality of charged batteries available at the charging station for swapping based on at least a battery swapping count provided by a user;
assigning, by the charging station server, at least one of a static identifier (ID) or a dynamic ID to each of the set of charged batteries including first and second subsets of charged batteries,
wherein each of the first subset of charged batteries is configured as a master battery by integrating at least the respective static ID in a battery management system (BMS) of each of the first subset of charged batteries and each of the second subset of charged batteries is configured as a slave battery by integrating at least the respective dynamic ID in a BMS of each of the second subset of charged batteries, and
wherein the static and dynamic IDs are assigned and integrated for facilitating the in-vehicle battery communication; and
releasing, by the charging station server, the set of charged batteries from a charging and storing platform of the charging station to a swapping platform of the charging station for swapping the set of discharged batteries with the set of charged batteries.

2. The method of claim 1, further comprising:
authenticating, by the charging station server, the user upon reception of the swap request; and
receiving, by the charging station server from the computing device, upon successful authentication of the user, the battery swapping count indicating a number of batteries that needs to be swapped, wherein the set of charged batteries is selected from the plurality of charged batteries upon reception of the battery swapping count such that a number of charged batteries in the set of charged batteries is equal to the battery swapping count.

3. The method of claim 2, further comprising retrieving, by the charging station server from a database server, upon successful authentication of the user, a set of parameters associated with the user, wherein the set of parameters includes at least one of user profile information, vehicle information, or battery count information that indicates the maximum number of batteries in the vehicle, and wherein the set of charged batteries is selected based on the set of parameters.

4. The method of claim 1, further comprising:
detecting, by the charging station server, an indication indicating reception of the set of discharged batteries at the swapping platform from the user for swapping with the set of charged batteries; and
retrieving, by the charging station server from a BMS of each of the set of discharged batteries, battery ID information that includes at least one of a previously assigned static or dynamic ID, wherein each charged battery is assigned at least one of the static ID or the dynamic ID based on the battery ID information of each discharged battery for which swapping is currently being performed.

5. The method of claim 4, further comprising resetting, by the charging station server, the set of discharged batteries after retrieving the battery ID information from each of the set of discharged batteries.

6. The method of claim 4, wherein an order of releasing each of the set of charged batteries is based on an order of receiving each of the set of discharged batteries for swapping with the set of charged batteries.

7. The method of claim 1, wherein, prior to swapping, the set of discharged batteries is communicatively coupled to an in-vehicle communication network of the vehicle, and wherein, after swapping the set of discharged batteries with the set of charged batteries, the set of charged batteries is communicatively coupled to the in-vehicle communication network including a set of nodes.

8. The method of claim 7, wherein the in-vehicle communication network is a controller area network (CAN), and wherein the set of charged batteries and the set of nodes communicate with each other by way of a CAN bus.

9. The method of claim 7, further comprising selecting, by the charging station server, from the set of charged batteries, the first subset of charged batteries including at least a first charged battery to be configured as the master battery,
wherein the static ID is assigned to the first charged battery for facilitating communication between the master battery and each node in the in-vehicle communication network, and
wherein the dynamic ID is assigned to each slave battery for facilitating communication between the master battery and each slave battery in the vehicle.

10. The method of claim 9, wherein the dynamic ID of each slave battery is further integrated in the BMS of the master battery, and wherein the master battery broadcasts the static ID to the set of nodes for managing the in-vehicle battery communication, when the master battery is communicatively coupled to the in-vehicle communication network.

11. A battery swapping system to manage in-vehicle battery communication, the system comprising:
circuitry configured to:
receive, from a computing device, a swap request to swap a set of discharged batteries in a vehicle with a set of charged batteries available at a charging station;
select the set of charged batteries from a plurality of charged batteries available at the charging station to swap based on at least a battery swapping count provided by a user;
assign at least one of a static identifier (ID) or a dynamic ID to each of the set of charged batteries that includes first and second subsets of charged batteries,
wherein each of the first subset of charged batteries is configured as a master battery by integration of at least the respective static ID in a battery management system (BMS) of each of the first subset of charged batteries and each of the second subset of charged batteries is configured as a slave battery by integration of at least the respective dynamic ID in a BMS of each of the second subset of charged batteries, and
wherein the static and dynamic IDs are assigned and integrated to facilitate the in-vehicle battery communication; and
release the set of charged batteries from a charging and storing platform of the charging station to a swapping platform of the charging station to swap the set of discharged batteries with the set of charged batteries.

12. The system of claim 11, wherein the circuitry is further configured to:
authenticate the user upon reception of the swap request; and
receive, from the computing device, upon successful authentication of the user, the battery swapping count that indicates a number of batteries that needs to be swapped, wherein the set of charged batteries is selected from the plurality of charged batteries upon reception of the battery swapping count such that a number of charged batteries in the set of charged batteries is equal to the battery swapping count.

13. The system of claim 12, wherein the circuitry is further configured to retrieve, from a database server, upon successful authentication of the user, a set of parameters associated with the user, wherein the set of parameters includes at least one of user profile information, vehicle information, or a battery count information that indicates the maximum number of batteries in the vehicle, and wherein the set of charged batteries is selected based on the set of parameters.

14. The system of claim 11, wherein the circuitry is further configured to:
detect an indication that indicates reception of the set of discharged batteries at the swapping platform from the user to swap with the set of charged batteries; and
retrieve, from a BMS of each of the set of discharged batteries, battery ID information that includes at least one of a previously assigned static or dynamic ID, wherein each charged battery is assigned at least one of the static ID or the dynamic ID based on the battery ID information of each discharged battery.

15. The system of claim 14, wherein the circuitry is further configured to reset the set of discharged batteries after retrieval of the battery ID information from each of the set of discharged batteries.

16. The system of claim 14, wherein an order to release each of the set of charged batteries is based on an order to receive each of the set of discharged batteries to swap with the set of charged batteries.

17. The system of claim 11, wherein, prior to the swap, the set of discharged batteries is communicatively coupled to an in-vehicle communication network of the vehicle, and wherein, after the swap, the set of charged batteries is communicatively coupled to the in-vehicle communication network that includes a set of nodes.

18. The system of claim 17, wherein the in-vehicle communication network is a controller area network (CAN), and wherein the set of charged batteries and the set of nodes communicate with each other by way of a CAN bus.

19. The system of claim 17, wherein the circuitry is further configured to select, from the set of charged batteries, the first subset of charged batteries that includes at least a first charged battery to be configured as the master battery,
wherein the static ID is assigned to the first charged battery to facilitate communication between the master battery and each node in the in-vehicle communication network, and
wherein the dynamic ID is assigned to each slave battery to facilitate communication between the master battery and each slave battery in the vehicle.

20. The system of claim 19, wherein the dynamic ID of each slave battery is further integrated in the BMS of the master battery, and wherein the master battery broadcasts the static ID to the set of nodes to manage the in-vehicle battery communication, when the master battery is communicatively coupled to the in-vehicle communication network.

* * * * *